US012573035B2

(12) United States Patent
Chen et al.

(10) Patent No.: US 12,573,035 B2
(45) Date of Patent: Mar. 10, 2026

(54) SYSTEMS AND METHODS FOR IMAGE PROCESSING

(71) Applicant: PEKING UNIVERSITY, Beijing (CN)

(72) Inventors: Liangyi Chen, Beijing (CN); Xiaoshuai Huang, Beijing (CN); Junchao Fan, Beijing (CN); Jianyong Wang, Beijing (CN); Bo Zhou, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 386 days.

(21) Appl. No.: 18/171,394

(22) Filed: Feb. 20, 2023

(65) Prior Publication Data

US 2024/0281962 A1     Aug. 22, 2024

(51) Int. Cl.
    *G06T 7/00*        (2017.01)
    *G06V 10/82*     (2022.01)

(52) U.S. Cl.
    CPC ............ *G06T 7/0012* (2013.01); *G06V 10/82* (2022.01); *G06T 2207/10056* (2013.01); *G06T 2207/20081* (2013.01); *G06T 2207/30024* (2013.01)

(58) Field of Classification Search
None
See application file for complete search history.

(56) References Cited

U.S. PATENT DOCUMENTS

2020/0279411 A1    9/2020  Atria et al.
2021/0056692 A1*  2/2021  Zhou ...................... G06V 10/82

2021/0104023 A1    4/2021  Cao et al.
2021/0158583 A1*  5/2021  Huang .................. G06T 11/005
2021/0166446 A1*  6/2021  Chen ...................... G06N 3/044
2021/0383516 A1   12/2021  Chen et al.
2022/0092755 A1*  3/2022  Lyu ........................ G06N 3/045

FOREIGN PATENT DOCUMENTS

WO      2021042857 A1   3/2021

OTHER PUBLICATIONS

Lord Rayleigh, On the Theory of Optical Images, with Special Reference to the Microscope, Journal of the Royal Microscopical Society, 447-473, 1903.
Albert H. Coons, The Beginnings of Immunofluorescence, The Journal of Immunology, 87: 499-503, 1961.
Eric Betzig et al., Imaging Intracellular Fluorescent Proteins at Nanometer Resolution, Science, 313: 1642-1645, 2006.

(Continued)

*Primary Examiner* — Mark R Milia
(74) *Attorney, Agent, or Firm* — METIS IP LLC

(57) ABSTRACT

Methods and systems for image processing are provided. The method may include obtaining image data generated by an image acquisition device; generating a preliminary image by processing the image data; and generating a target image by using an image processing model to process the preliminary image according to an optimization algorithm. The image processing model includes a first sub-model and a second sub-model. The first sub-model is configured to determine a first optimization term related to a likelihood term of an objective function, and the second sub-model is configured to determine a second optimization term related to a regularization term of the objective function, wherein the second sub-model is a trained machine-learning model.

20 Claims, 22 Drawing Sheets

(56) References Cited

OTHER PUBLICATIONS

Michael J Rust et al., Sub-Diffraction-Limit Imaging by Stochastic Optical Reconstruction Microscopy (Storm), Nature Methods, 3(10): 793-795, 2006.

Stefan W. Hell et al., Breaking the Diffraction Resolution Limit by Stimulated Emission: Stimulated-Emission- Depletion Fluorescence Microscopy, Optics Letters, 19(11): 780-782, 1994.

Thomas A. Klar et al., Subdiffraction Resolution in Far-Field Fluorescence Microscopy, Optics Letters, 24(14): 954-956, 1999.

Jonas Folling et al., Fluorescence Nanoscopy by Ground-State Depletion and Single Molecule Return, Nature Methods, 5(11): 943-945, 2008.

R. Heintzmann et al., Laterally Modulated Excitation Microscopy: Improvement of Resolution by Using a Diffraction Grating, Proceedings of SPIE, 185-196, 1998.

M. G. L. Gustafsson, Surpassing the Lateral Resolution Limit by a Factor of Two Using Structured Illumination Microscopy, Journal of Microscopy, 198(2): 82-87, 2000.

Mats G. L. Gustafsson, Nonlinear Structured-Illumination Microscopy: Wide-field Fluorescence Imaging with Theoretically Unlimited Resolution, Proceedings of the National Academy of Sciences, 102(37): 13081-13086, 2005.

E. Hesper Rego et al., Nonlinear Structured-illumination Microscopy with a Photoswitchable Protein Reveals Cellular Structures at 50-nm Resolution, Proceedings of the National Academy of Sciences, 109(3): E135-E143, 2012.

Li, Dong et al., Extended-Resolution Structured Illumination Imaging of Endocytic and Cytoskeletal Dynamics, Science, 349(6251): 944&aab3500-1-aab3500-10, 2015.

Hui-Wen Lu-Walther et al., Nonlinear Structured Ilumination Using a Fluorescent Protein Activating at the Readout Wavelength, PLOS One, 1-14, 2016.

Huang, Xiaoshuai et al., Ultra-semsitive Super Resolution Imaging with Hessian Structured Illumination Microscopy in Live Cells, Bulletin of National Natural Science Foundation of China, 367-375, 2018.

Huang, Xiaoshuai, Fast, Long-Term Super-Resolution Imaging with Hessian Structured Illumination Microscopy, 2018, 100 pages.

Fan, Junchao, Reconstruction of Super-Resolution Microscopy with Structured Illumination, China Doctoral Dissertations Full-text Database, 2022, 168 pages.

Alexey Sharonov et al., Wide-field Subdiffraction Imaging by Accumulated Binding of Diffusing Probes, Proceedings of the National Academy of Sciences, 103(50): 18911-18916, 2006.

Amit Lal et al., Structured Illumination Microscopy Image Reconstruction Algorithm, IEEE Journal of Selected Topics in Quantum Electronics, 2015, 15 pages.

Jonathon Nixon-Abell et al., Increased Spatiotemporal Resolution Reveals Highly Dynamic Dense Tubular Matrices in the Peripheral ER, Science, 354(6311): 433 &aaf3928-1-aaf3928-12, 2016.

Chu, Kaiqin et al., Image Reconstruction for Structured-Illumination Microscopy with Low Signal Level, Optics Express, 22(7): 8687-8702, 2014.

Huang, Xiaoshuai et al., Fast, Long-term, Super-resolution Imaging with Hessian Structured Illumination Microscopy, Nature Biotechnology, 1-9, 2018.

Zhao, Weisong et al., Sparse Deconvolution Improves the Resolution of Live-Cell Super-Resolution Fluorescence Microscopy, Nature Biotechnology, 40: 606-617, 2022.

Charles N. Christensen et al., ML-SIM: Universal Reconstruction of Structured Illumination Microscopy Images Using Transfer Learning, Biomedical Optics Express, 12(5): 2720-2733, 2021.

Jin, Luhong et al., Deep Learning Enables Structured Illumination Microscopy with Low Light Levels and Enhanced Speed, Nature Communications, 11: 1-7, 1934.

Qiao, Chang et al., Evaluation and Development of Deep Neural Networks for Image Super-Resolution in Optical Microscopy, Nature Methods, 18: 194-202, 2021.

Rainer Heintzmann et al., Saturated Patterned Excitation Microscopy—A Concept for Optical Resolution Improvement, Journal of the Optical Society of America A, 19(8): 1599-1609, 2002.

Mark Stanford Robbins et al., The Noise Performance of Electron Multiplying Charge-Coupled Devices, IEEE Transactions on Electron Devices, 50(5): 1227-1232, 2003.

Jaroslav Hynecek et al., Excess Noise and Other Important Characteristics of Low Light Level Imaging Using Charge Multiplying CCDs, IEEE Transactions on Electron Devices, 50(1): 239-245, 2003.

Michael Hirsch et al., A Stochastic Model for Electron Multiplication Charge-Coupled Devices—From Theory to Practice, PLOS One, 8(1): e53671-1-e53671-13, 2013.

Mo, Yanquan et al., Structured Illumination Microscopy Artefacts Caused by Illumination Scattering, Philosophical Transactions of the Royal Society A, 2020, 12 pages.

Tom Goldstein et al., The Split Bregman Method for L1-Regularized Problems, SIAM Journal on Imaging Sciences, 2(2): 323-343, 2009.

Olaf Ronneberger et al., U-net: Convolutional Networks for Biomedical Image Segmentation, Arxiv org, 234-241, 2015.

Hu, Jie et al., Squeeze-and-Excitation Networks, IEEE Transactions on Pattern Analysis and Machine Intelligence, 2020, 13 pages.

Erich Kobler et al., Total Deep Variation for Linear Inverse Problems, 2020 IEEE/CVF Conference on Computer Vision and Pattern Recognition(CVPR), 7546-7555, 2020.

Wen, Gang et al., High-Fidelity Structured Illumination Microscopy by Point-Spread-Function Engineering, Light: Science & Applications, 10(70): 1-12, 2021.

Chen, Yunjin et al., Trainable Nonlinear Reaction Diffusion: A Flexible Framework for Fast and Effective Image Restoration, IEEE Transactions om Pattern Analysis and Machine Intelligence, 2016, 15 pages.

Liu, Jiahao et al., Deep Learning-Enhanced Fluorescence Microscopy via Degeneration Decoupling, Optics Express, 28(10): 14859-14873, 2020.

International Search Report in PCT/CN2024/077786 mailed on May 17, 2024, 3 pages.

Written Opinion in PCT/CN2024/077786 mailed on May 17, 2024, 4 pages.

Li, Zhiming, Super resolution reconstruction algorithm based on L1 norm of total variation regularization, Computer Engineering and Applications, 52(15): 212-216, 2016.

* cited by examiner

500

600

SYSTEMS AND METHODS FOR IMAGE PROCESSING

TECHNICAL FIELD

The present disclosure relates to the field of image processing, and in particular, to systems and methods for reconstructing an image based on image data generated by an image acquisition device.

BACKGROUND

Super-resolution microscopy is a series of techniques in optical microscopy that allow images to have resolutions higher than those imposed by the diffraction limit. The emergence of super-resolution (SR) fluorescence microscopy technologies may have revolutionized biology and enabled previously unappreciated and intricate structures to be observed, such as periodic actin rings in neuronal dendrites, nuclear pore complex structures, and the organization of pericentriolar materials surrounding the centrioles. Since super-resolution microscopic images are expected to show a clear and accurate view of microstructures, requirements for the image quality of the SR microscopic images are usually high. Many conventional techniques for reconstructing super-resolution microscopic images suffer from artifacts. Moreover, sometimes even errors may occur in the reconstructed image. Therefore, it is desirable to provide systems and methods for reconstructing images with improved quality.

SUMMARY

According to an aspect of the present disclosure, a method for image processing is provided. The method is implemented on a machine having at least one processor and at least one storage device. The method may include obtaining image data generated by an image acquisition device; generating a preliminary image by processing the image data; generating a target image by using an image processing model to process the preliminary image according to an optimization algorithm, the image processing model including a first sub-model and a second sub-model. The first sub-model may be configured to determine a first optimization term related to a likelihood term of an objective function. The second sub-model may be configured to determine a second optimization term related to a regularization term of the objective function, wherein the second sub-model is a trained machine-learning model.

In some embodiments, the optimization algorithm is an iterative algorithm. The generating a target image by using an image processing model to process the preliminary image according to an optimization algorithm includes: in a first iterative operation, generating, based on the preliminary image, a first intermediate optimization term related to the likelihood term using the first sub-model; generating, based on the preliminary image, a second intermediate optimization term related to the regularization term using the second sub-model; and generating an intermediate image based on the first intermediate optimization result, the second intermediate optimization result, and the preliminary image.

In some embodiments, the generating a target image by using an image processing model to process the preliminary image according to an optimization algorithm further includes: generating the target image by performing a plurality of continuing iterative operations based on the intermediate image until a termination criterion is met.

In some embodiments, the first iterative operation and the plurality of continuing iterative operations are configured to minimize a result of the objective function.

In some embodiments, the first optimization term is a derivative of the likelihood term, and the second optimization term is a derivative of the regularization term.

In some embodiments, the trained machine-learning model is a deep learning neural network based on total deep variation (TDV) regularization, Tikhonov regularization, total variation (TV) regularization, or sparsity regularization.

In some embodiments, the likelihood term is determined based on an imaging principle of the image acquisition device.

In some embodiments, the image processing model is obtained by a training operation including: obtaining a plurality of training datasets, each of the plurality of training datasets including a sample preliminary image and a sample optimized image; training a preliminary model using the plurality of training datasets to obtain the image processing model.

In some embodiments, each of at least a portion of the training datasets includes a sample preliminary image and a sample optimized image, which has a higher signal-noise ratio than the sample preliminary image.

In some embodiments, during the training operation, model parameters relating to the second sub-model are updated.

According to an aspect of the present disclosure, a system for image processing is provided. The system may include at least one storage device including a set of instructions; and at least one processor in communication with the at least one storage device, wherein when executing the set of instructions, the at least one processor is directed to cause the system to perform operations including: obtaining image data generated by an image acquisition device; generating a preliminary image by processing the image data, generating a target image by using an image processing model to process the preliminary image according to an optimization algorithm, the image processing model including a first sub-model and a second sub-model, wherein the first sub-model is configured to determine a first optimization term related to a likelihood term of an objective function, and the second sub-model is configured to determine a second optimization term related to a regularization term of the objective function, wherein the second sub-model is a trained machine-learning model.

According to an aspect of the present disclosure, a non-transitory computer readable medium, comprising at least one set of instructions for image processing, wherein when executed by one or more processors of a computing device, the at least one set of instructions causes the computing device to perform a method. The method may include obtaining image data generated by an image acquisition device; generating a preliminary image by processing the image data; generating a target image by using an image processing model to process the preliminary image according to an optimization algorithm, the image processing model including a first sub-model and a second sub-model. The first sub-model may be configured to determine a first optimization term related to a likelihood term of an objective function. The second sub-model may be configured to determine a second optimization term related to a regularization term of the objective function, wherein the second sub-model is a trained machine-learning model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in detail of exemplary embodiments. These exemplary embodiments are described in detail with reference to the drawings. These embodiments are not limiting, and in these embodiments, the same number indicates the same structure, wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including." when used in this specification, specify the presence of stated features, integers, steps, operations, elements, and/or components, but do not preclude the presence or addition of one or more other features, integers, steps, operations, elements, components, and/or groups thereof. It will be understood that the term "object" and "subject" may be used interchangeably as a reference to a thing that undergoes an imaging procedure of the present disclosure.

It will be understood that the term "system," "engine," "unit," "module," and/or "block" used herein are one method to distinguish different components, elements, parts, sections or assemblies of different levels in ascending order. However, the terms may be displaced by another expression if they achieve the same purpose.

Figure 2:
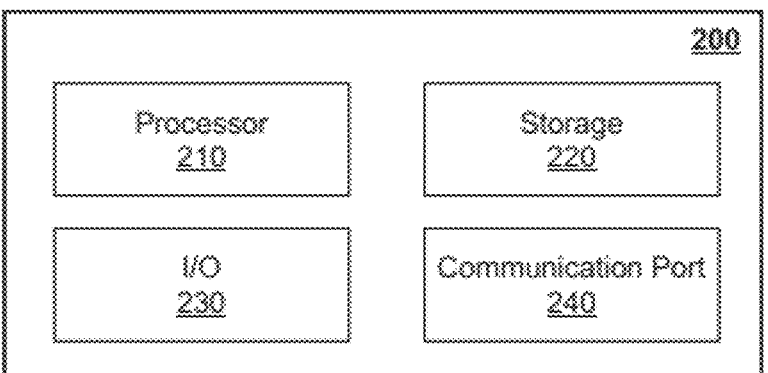
FIG. 2 is a schematic diagram illustrating an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption before execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included in programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context indicates otherwise. As used herein, the term "and/or" includes any and all combinations of one or more of the associated listed items.

It should be noted that when an operation is described to be performed on an image, the term "image" used herein may refer to a dataset (e.g., a matrix) that contains values of pixels (pixel values) in the image. As used herein, a representation of an object (e.g., a person, an organ, a cell, or a portion thereof) in an image may be referred to as the object for brevity. For instance, a representation of a cell or organelle (e.g., mitochondria, endoplasmic reticulum, centrosome, Golgi apparatus, etc.) in an image may be referred to as the cell or organelle for brevity. As used herein, an operation on a representation of an object in an image may be referred to as an operation on the object for brevity. For instance, a segmentation of a portion of an image including a representation of a cell or organelle from the image may be referred to as a segmentation of the cell or organelle for brevity.

It should be understood that the term "resolution" as used herein, refers to a measure of the sharpness of an image. The term "super-resolution" or "super-resolved" or "SR" as used herein, refers to an enhanced (or increased) resolution, e.g., which may be obtained by a process of combining a sequence of low-resolution images to generate a higher resolution image or sequence.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in inverted order, or simultaneously. Moreover, one or more other operations may be added to the flowcharts. One or more operations may be removed from the flowcharts.

Conventional methods for reconstructing an image are usually based on the imaging principle of the image acquisition device (or a physical model reflecting the imaging principle of the image acquisition device). Images with a relatively high resolution (e.g., super-resolution microscopic images) generated by these conventional methods often include one or more artifacts or have an unsatisfying signal-noise ratio. With the development of image processing techniques, trained machine-learning models have the potential to generate a target image with high quality based on image data collected or generated by the image acquisition device. However, since the reconstruction process using a trained machine-learning model is not constrained by the imaging principle, the quality of the target image relies on the training sets used for obtaining the trained machine-learning models. As a result, images generated by the trained machine-learning model may include some errors.

According to the systems and methods of the present disclosure, the image data generated from the image acquisition device may be used to generate a preliminary image.

The preliminary image may be optimized to generate the target image based on an objective function using an image processing model. The image processing model may include a first sub-model and a second sub-model. The first sub-model may be configured to determine a first optimization term related to a likelihood term of an objective function. The second sub-model may be configured to determine a second optimization term related to a regularization term of the objective function. The second sub-model may be a trained machine-learning model. The use of the trained machine-learning model is effective in reducing artifacts or noise in the target image. Moreover, the use of the likelihood term ensures that the reconstruction is based on the imaging principle, thus reducing or avoiding errors in the target image.

Moreover, although the systems and methods disclosed in the present disclosure are described primarily regarding the processing of images generated by structured illumination microscopy (SIM), it should be understood that the descriptions are merely provided for illustration, and not intended to limit the scope of the present disclosure. The systems and methods of the present disclosure may be applied to any other kind of system including an image acquisition device for image processing. For example, the systems and methods of the present disclosure may be applied to microscopes, telescopes, cameras (e.g., surveillance cameras, camera phones, webcams), unmanned aerial vehicles, medical imaging devices, or the like, or any combination thereof.

It should be understood that application scenarios of systems and methods disclosed herein are only some exemplary embodiments provided for illustration, and not intended to limit the scope of the present disclosure. For persons having ordinary skills in the art, multiple variations and modifications may be made under the teachings of the present disclosure.

Figure 1:
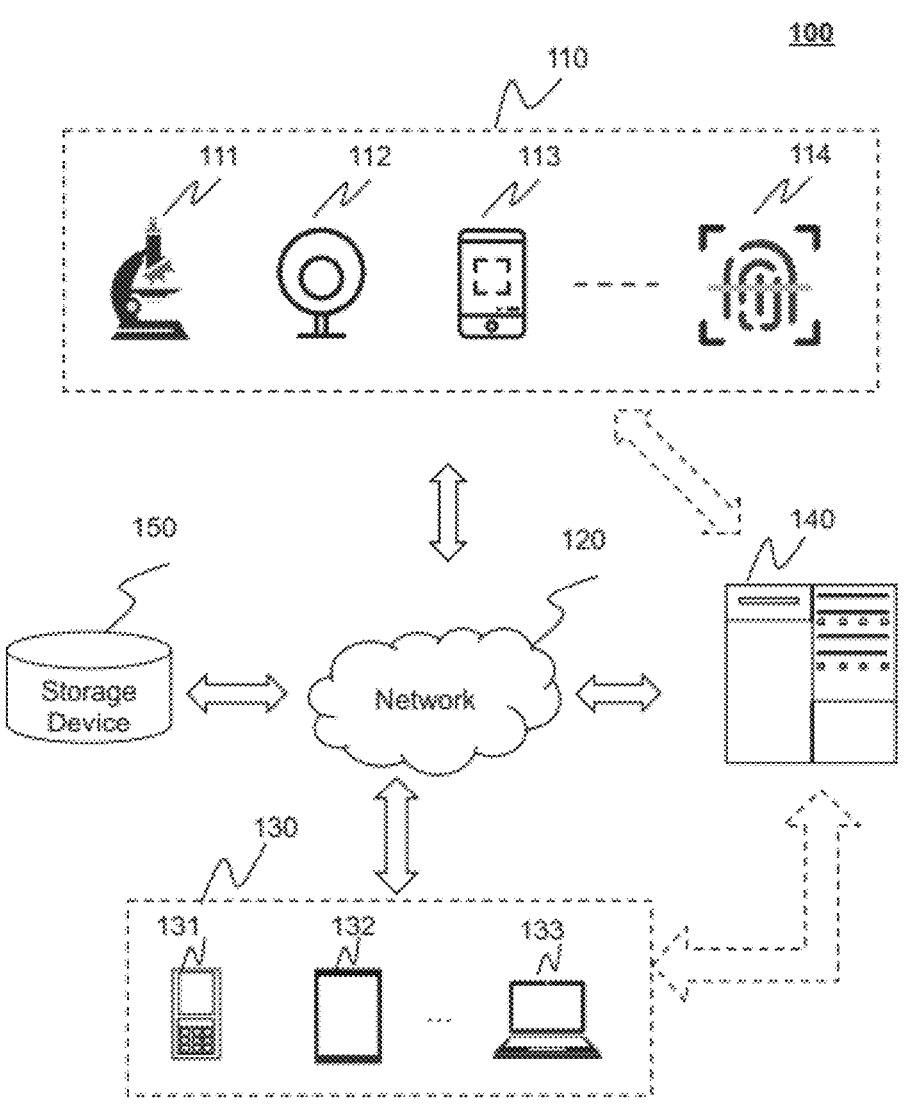
FIG. 1 is a schematic diagram illustrating an exemplary application scenario of an image processing system according to some embodiments of the present disclosure.

FIG. 1 is a schematic diagram illustrating an exemplary application scenario of an image processing system according to some embodiments of the present disclosure. As shown in FIG. 1, the image processing system 100 may include an image acquisition device 110, a network 120, one or more terminals 130, a processor 140, and a storage device 150.

The components in the image processing system 100 may be connected in one or more of various ways. Merely by way of example, the image acquisition device 110 may be connected to the processor 140 through the network 120. As another example, the image acquisition device 110 may be connected to the processor 140 directly as indicated by the bi-directional arrow in dotted lines linking the image acquisition device 110 and the processor 140. As still another example, the storage device 150 may be connected to the processor 140 directly or through the network 120. As a further example, the terminal 130 may be connected to the processor 140 directly (as indicated by the bi-directional arrow in dotted lines linking the terminal 130 and the processor 140) or through the network 120.

Figure 5:
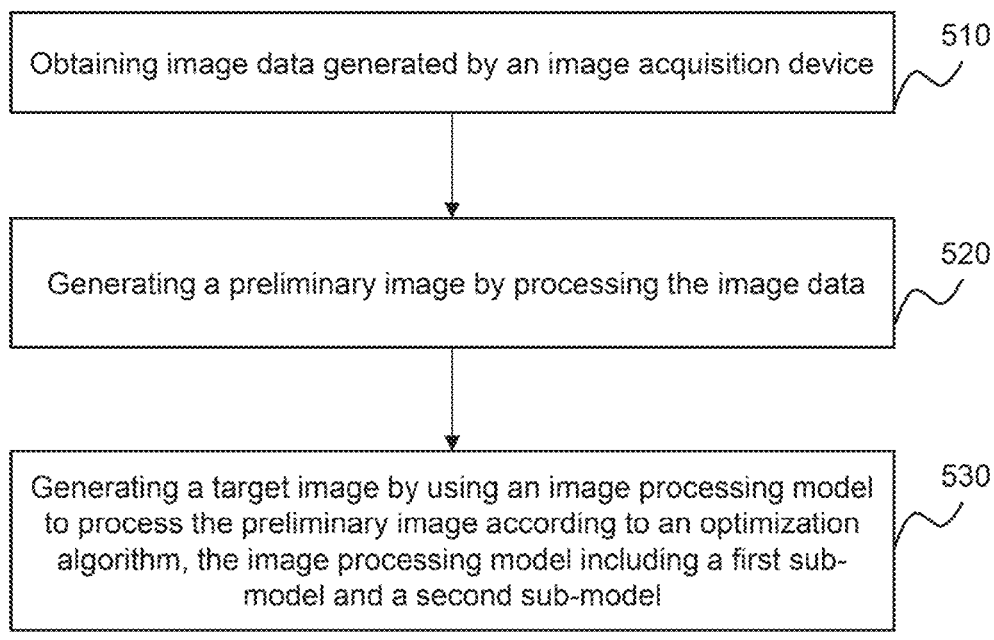
FIG. 5 is a flowchart illustrating an exemplary process for image processing according to some embodiments of the present disclosure.

The imaging processing system 100 may be configured to generate a target image using an image processing model (e.g., as shown in process 500 of FIG. 5). The target image may be with a relatively high resolution that can extend beyond physical limits posed by the image acquisition device 110. For example, the imaging processing system 100 may obtain a plurality of raw cell images with a relatively low signal-noise ratio generated by the image acquisition device 110 (e.g., SIM). As another example, the image processing system 100 may obtain one or more images captured by the image acquisition device 110 (e.g., a camera phone or a phone with a camera). The one or more images may be blurred and/or with relatively low resolutions, as factors such as a shaking of the camera phone, moving of an object to be imaged, an inaccurate focusing, etc. during the capturing and/or physical limits posed by the camera phone. The image processing system 100 may process the image(s) by using the image processing model to generate one or more target images with relatively high quality. Thus, the image processing system 100 may display the target images(s) with a relatively high quality for a user of the image processing system 100.

The image acquisition device 110 may be configured to obtain image data associated with a subject within its detection region. In the present disclosure, "object" and "subject" are used interchangeably. The subject may include one or more biological or non-biological objects. In some embodiments, the image acquisition device 110 may be an optical imaging device, a radioactive-ray-based imaging device (e.g., a computed tomography device), a nuclide-based imaging device (e.g., a positron emission tomography device), a magnetic resonance imaging device), etc. Exemplary optical imaging devices may include a microscope 111 (e.g., a fluorescence microscope), a surveillance device 112 (e.g., a security camera), a mobile terminal device 113 (e.g., a camera phone), a scanning device 114 (e.g., a flatbed scanner, a drum scanner, etc.), a telescope, a webcam, or the like, or any combination thereof. In some embodiments, the optical imaging device may include a capture device (e.g., a detector or a camera) for collecting the image data. For illustration purposes, the present disclosure may take the microscope 111 as an example for describing exemplary functions of the image acquisition device 110. Exemplary microscopes may include a structured illumination microscope (SIM) (e.g., a two-dimensional SIM (2D-SIM), a three-dimensional SIM (3D-SIM), a total internal reflection SIM (TIRF-SIM), a spinning-disc confocal-based SIM (SD-SIM), etc.), a photoactivated localization microscopy (PALM), a stimulated emission depletion fluorescence microscopy (STED), a stochastic optical reconstruction microscopy (STORM), etc. The SIM may include a detector such as an EMCCD camera, an sCMOS camera, etc. The subjects detected by the SIM may include one or more objects of biological structures, biological issues, proteins, cells, microorganisms, or the like, or any combination. Exemplary cells may include INS-1 cells, COS-7 cells, Hela cells, liver sinusoidal endothelial cells (LSECs), human umbilical vein endothelial cells (HUVECs), HEK293 cells, or the like, or any combination thereof. In some embodiments, the one or more objects may be fluorescent or fluorescent-labeled. The fluorescent or fluorescent-labeled objects may be excited to emit fluorescence for imaging.

The network 120 may include any suitable network that can facilitate the image processing system 100 to exchange information and/or data. In some embodiments, one or more of components (e.g., the image acquisition device 110, the terminal(s) 130, the processor 140, the storage device 150, etc.) of the image processing system 100 may communicate information and/or data with one another via the network 120. For example, the processor 140 may acquire image data from the image acquisition device 110 via the network 120. As another example, the processor 140 may obtain user instructions from the terminal(s) 130 via the network 120. The network 120 may be and/or include a public network (e.g., the Internet), a private network (e.g., a local area network (LAN), a wide area network (WAN), etc.), a wired network (e.g., an Ethernet), a wireless network (e.g., an 802.11 network, a Wi-Fi network, etc.), a cellular network (e.g., a Long Term Evolution (LTE) network), an image relay network, a virtual private network ("VPN"), a satellite network, a telephone network, a router, a hub, a switch, a server computer, and/or a combination of one or more thereof. For example, the network 120 may include a cable network, a wired network, a fiber network, a telecommunication network, a local area network, a wireless local area network (WLAN), a metropolitan area network (MAN), a public switched telephone network (PSTN), a Bluetooth™ network, a ZigBee™ network, a near field communication network (NFC), or the like, or a combination thereof. In some embodiments, the network 120 may include one or more network access points. For example, the network 120 may include wired and/or wireless network access points, such as base stations and/or network switching points, through which one or more components of the image processing system 100 may access the network 120 for data and/or information exchange.

In some embodiments, a user may operate the image processing system 100 through the terminal(s) 130. The terminal(s) 130 may include a terminal 131, a tablet computer 132, a laptop computer 133, or the like, or a combination thereof. In some embodiments, the terminal 131 may include a smart home device, a wearable device, a mobile device, a virtual reality device, an augmented reality device, or the like. In some embodiments, the smart home device may include a smart lighting device, a control device of an intelligent electrical apparatus, a smart monitoring device, a smart television, a smart video camera, an interphone, or the like, or a combination thereof. In some embodiments, the wearable device may include a bracelet, footgear, glasses, a helmet, a watch, clothing, a backpack, a smart accessory, or the like, or a combination thereof. In some embodiments, the mobile device may include a mobile phone, a personal digital assistant (PDA), a gaming device, a navigation device, a point of sale (POS) device, a laptop, a tablet computer, a desktop, or the like, or a combination thereof. In some embodiments, the virtual reality device and/or augmented reality device may include a virtual reality helmet, virtual reality glasses, a virtual reality eyewear, an augmented reality helmet, augmented reality glasses, an augmented reality eyewear, or the like, or a combination thereof. For example, the virtual reality device and/or augmented reality device may include a Google Glass™, an Oculus Rift™, a Hololens™, a Gear VR™, or the like. In some embodiments, the terminal(s) 130 may be part of the processor 140.

The processor 140 may process data and/or information obtained from the image acquisition device 110, the terminal(s) 130, and/or the storage device 150. For example, the processor 140 may process image data generated by the image acquisition device 110 to generate a target image with a relatively high quality. In some embodiments, the processor 140 may be a server or a server group. The server group may be centralized or distributed. In some embodiments, the processor 140 may be local or remote. For example, the processor 140 may access information and/or data stored in the image acquisition device 110, the terminal(s) 130, and/or the storage device 150 via the network 120. As another example, the processor 140 may be directly connected to the image acquisition device 110, the terminal(s) 130, and/or the storage device 150 to access stored information and/or data. In some embodiments, the processor 140 may be implemented on a cloud platform. For example, the cloud platform may include a private cloud, a public cloud, a hybrid cloud, a community cloud, a distributed cloud, an interconnected cloud, a multiple cloud, or the like, or a combination thereof. In some embodiments, the processor 140 may be implemented by a computing device 200 having one or more components as described in FIG. 2.

The storage device 150 may store data, instructions, and/or any other information. In some embodiments, the storage device 150 may store data obtained from the terminal(s) 130, the image acquisition device 110, and/or the processor 140. In some embodiments, the storage device 150 may store data and/or instructions that the processor 140 may execute or use to perform exemplary methods described in the present disclosure. In some embodiments, the storage device 150 may include a mass storage device, a removable storage device, a volatile read-and-write memory, a read-only memory (ROM), or the like. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be executed on a cloud platform. For example, the cloud platform may include a private cloud, a public cloud, a hybrid cloud, a community cloud, a distributed cloud, an interconnected cloud, a multiple cloud, or the like, or a combination thereof.

In some embodiments, the storage device 150 may be connected to the network 120 to communicate with one or more other components (e.g., the processor 140, the terminal(s) 130, etc.) of the image processing system 100. One or more components of the image processing system 100 may access data or instructions stored in the storage device 150 via the network 120. In some embodiments, the storage device 150 may be directly connected to or communicate with one or more other components (e.g., the processor 140, the terminal(s) 130, etc.) of the image processing system 100. In some embodiments, the storage device 150 may be part of the processor 140.

FIG. 2 is a schematic diagram illustrating an exemplary computing device according to some embodiments of the present disclosure. The computing device 200 may be used to implement any component of the image processing system 100 as described herein. For example, the processor 140 and/or the terminal(s) 130 may be implemented on the computing device 200, respectively, via its hardware, software program, firmware, or a combination thereof. Although only one such computing device is shown, for convenience, the computer functions relating to the image processing system 100 as described herein may be implemented in a distributed manner on a number of similar platforms, to distribute the processing load.

As shown in FIG. 2, the computing device 200 may include a processor 210, a storage 220, an input/output (I/O) 230, and a communication port 240.

The processor 210 may execute computer instructions (e.g., program code) and perform functions of the image processing system 100 (e.g., the processor 140) in accordance with the techniques described herein. The computer instructions may include, for example, routines, programs, objects, components, data structures, procedures, modules, and functions, which perform particular functions described herein. For example, the processor 210 may process image data obtained from any components of the image processing system 100. In some embodiments, the processor 210 may include one or more hardware processors, such as a micro-controller, a microprocessor, a reduced instruction set com-puter (RISC), an application specific integrated circuits (ASICs), an application-specific instruction-set processor (ASIP), a central processing unit (CPU), a graphics process-ing unit (GPU), a physics processing unit (PPU), a micro-controller unit, a digital signal processor (DSP), a field programmable gate array (FPGA), an advanced RISC machine (ARM), a programmable logic device (PLD), any circuit or processor capable of executing one or more functions, or the like, or a combination thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first proces-sor executes operation A and a second processor executes operation B, or the first and second processors jointly execute operations A and B).

The storage 220 may store data/information obtained from any component of the image processing system 100. In some embodiments, the storage 220 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

In some embodiments, the storage 220 may store one or more programs and/or instructions to perform exemplary methods described in the present disclosure. For example, the storage 220 may store a program for the processor 140 to process images generated by the image acquisition device 110.

The I/O 230 may input and/or output signals, data, information, etc. In some embodiments, the I/O 230 may enable user interaction with the image processing system 100 (e.g., the processor 140). In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network to facilitate data communications. The communi-cation port 240 may establish connections between the processor 140 and the image acquisition device 110, the terminal(s) 130, and/or the storage device 150. The connec-tion may be a wired connection, a wireless connection, any other communication connection that can enable data trans-mission and/or reception, and/or any combination of these connections. The wired connection may include, for example, an electrical cable, an optical cable, a telephone wire, or the like, or a combination thereof. The wireless connection may include a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed com-munication port. For example, the communication port 240 may be designed in accordance with the digital imaging and communications in medicine (DICOM) protocol.

Figure 3:
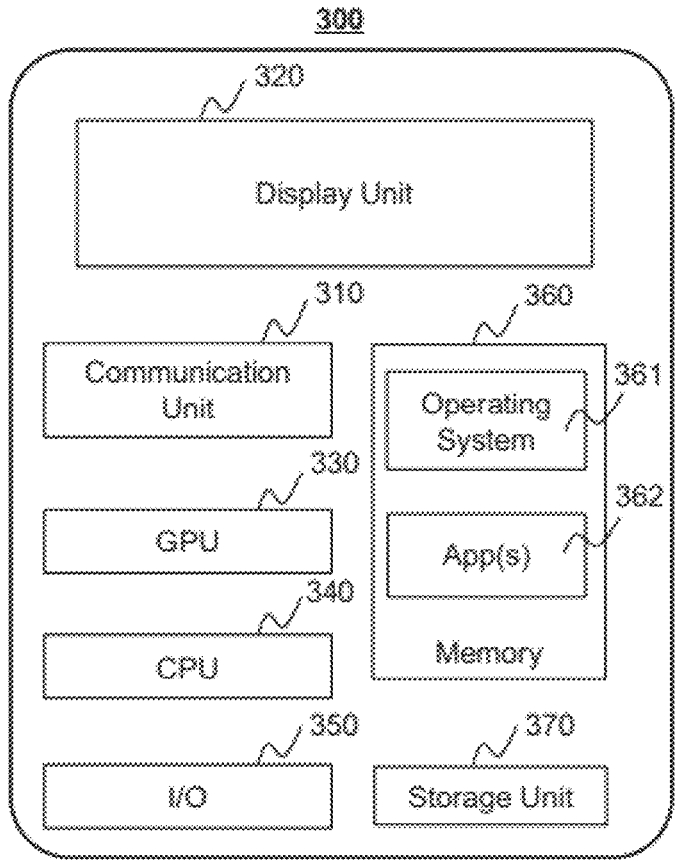
FIG. 3 is a block diagram illustrating an exemplary terminal according to some embodiments of the present disclosure.

FIG. 3 is a block diagram illustrating an exemplary terminal may be implemented according to some embodi-ments of the present disclosure.

As shown in FIG. 3, the terminal 300 may include a communication unit 310, a display unit 320, a graphics processing unit (GPU) 330, a central processing unit (CPU) 340, an I/O 350, a memory 360, a storage unit 370, etc. In some embodiments, any other suitable component, includ-ing but not limited to a system bus or a controller (not shown), may also be included in the terminal 300. In some embodiments, an operating system 361 (e.g., iOS™, Android™, Windows™, etc.) and one or more applications (apps) 362 may be loaded into the memory 360 from the storage unit 370 in order to be executed by the CPU 340. The application(s) 362 may include a browser or any other suitable apps for receiving and rendering information relat-ing to imaging, image processing, or other information from the image processing system 100 (e.g., the processor 140). User interactions with the information stream may be achieved via the I/O 350 and provided to the processor 140 and/or other components of the image processing system 100 via the network 120. In some embodiments, a user may input parameters to the image processing system 100, via the terminal 300.

In order to implement various modules, units and their functions described above, a computer hardware platform may be used as hardware platforms of one or more elements (e.g., the processor 140 and/or other components of the image processing system 100 described in FIG. 1). Since these hardware elements, operating systems and program languages are common; it may be assumed that persons skilled in the art may be familiar with these techniques and they may be able to provide information needed in the imaging and assessing according to the techniques described in the present disclosure. A computer with the user interface may be used as a personal computer (PC), or other types of workstations or terminal devices. After being properly pro-grammed, a computer with the user interface may be used as a server. It may be considered that those skilled in the art may also be familiar with such structures, programs, or general operations of this type of computing device.

Figure 4:
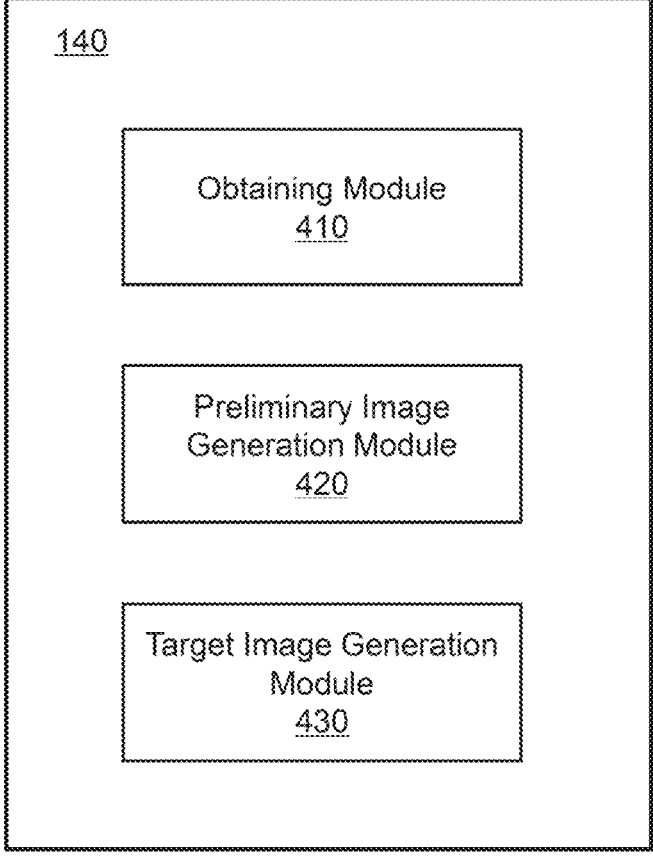
FIG. 4 is schematic diagrams illustrating an exemplary processor according to some embodiments of the present disclosure.

FIG. 4 is schematic diagrams illustrating an exemplary processor according to some embodiments of the present disclosure. As shown in FIG. 4, the processor 140 may include an obtaining module 410, a preliminary image generation module 420, and a target image generation module 430.

The obtaining module 410 may be configured to obtain information and/or data from one or more components of the image processing system 100. In some embodiments, the obtaining module 410 may obtain image data from the storage device 150 or the image acquisition device 110. As used herein, the image data may refer to raw data (e.g., one or more raw images) collected by the image acquisition device 110. More descriptions regarding obtaining the image data may be found elsewhere in the present disclosure (e.g., operation 510 in FIG. 5). In some embodiments, the obtaining module 410 may obtain an image processing model from the storage device 150.

The preliminary image generation module 420 may generate a preliminary image. In some embodiments, the preliminary image generation module 420 may determine the preliminary image by performing a filtering operation on the image data. Merely by way of example, the preliminary image generation module 420 may determine the preliminary image by performing Wiener filtering on one or more raw images. More descriptions regarding generating the preliminary image may be found elsewhere in the present disclosure (e.g., operation 520 in FIG. 5).

The target image generation module 430 may generate a target image based on the preliminary image using an image processing model according to an optimization algorithm. The image processing model may include a first sub-model and a second sub-model. The first sub-model may be configured to determine a first optimization term related to a likelihood term of an objective function. The second sub-model may be configured to determine a second optimization term related to a regularization term of the objective function. The second sub-model may be a trained machine-learning model. More descriptions regarding generating the target image may be found elsewhere in the present disclosure (e.g., operation 530 in FIG. 5).

It should be noted that the above description of modules of the processor 140 is merely provided for the purposes of illustration, and not intended to limit the present disclosure. For persons having ordinary skills in the art, the modules may be combined in various ways or connected with other modules as sub-systems under the teaching of the present disclosure and without departing from the principle of the present disclosure. In some embodiments, one or more modules may be added or omitted in the processor 140. In some embodiments, one or more modules in the processor 140 may be integrated into a single module to perform functions of the one or more modules.

FIG. 5 is a flowchart illustrating an exemplary process for image processing according to some embodiments of the present disclosure. In some embodiments, process 500 may be executed by the image processing system 100. For example, the process 500 may be implemented as a set of instructions (e.g., an application) stored in a storage device (e.g., the storage device 150, the storage 220, and/or the storage unit 370). In some embodiments, the processor 140 (e.g., the processor 210 of the computing device 200, the CPU 340 of the terminal 300, and/or one or more modules illustrated in FIG. 4) may execute the set of instructions and may accordingly be directed to perform the process 500. The operations of the illustrated process presented below are intended to be illustrative. In some embodiments, the process may be accomplished with one or more additional operations not described, and/or without one or more of the operations discussed. Additionally, the order in which operations of the process as illustrated in FIG. 5 and described below is not intended to be limiting.

In 510, the processor 140 (e.g., the obtaining module 402) may obtain image data generated by an image acquisition device.

In some embodiments, the image data herein may refer to raw data (e.g., one or more raw images) collected by the image acquisition device 110. The raw image may have a relatively low signal-noise ratio (SNR) or is partially damaged, or the like. Merely by way of example, for a SIM system, the image data may include one or more sets of raw images collected by the SIM system. Each set of raw images may include a plurality of raw images (e.g., 9 raw images, 15 raw images) corresponding to different phases and/or directions of sinusoidal illumination patterns applied to the subject (e.g., a cell sample). That is, the plurality of raw images may be collected by the SIM system at the different phases and/or directions.

In some embodiments, the processor 140 may obtain the image data from one or more components of the image processing system 100. For example, the image acquisition device 110 may collect and/or generate the image data and store the image data in the storage device 150. The processor 140 may retrieve and/or obtain the image data from the storage device 150. As another example, the processor 140 may directly obtain the image data from the image acquisition device 110.

In 520, the processor 140 (e.g., the preliminary image generation module 420) may generate a preliminary image based on the image data.

In some embodiments, the processor 140 may determine the preliminary image (e.g., the SR image) by filtering the image data. Exemplary filtering operations may include Wiener filtering, inverse filtering, least-squares filtering, or the like, or any combination thereof. For example, for each set of raw images of the image data, the processor 140 may generate an image stack (i.e., the preliminary image) by performing Wiener filtering on the plurality of raw images in the set of raw images. Specifically, if each set of raw images includes 9 raw images, the processor 140 may combine the 9 raw images in the set of raw images into the preliminary image. The preliminary image may include information in each of the 9 raw images and have a higher resolution than each of the 9 raw images. In some embodiments, the filtering operation may be omitted. For example, for a camera phone system, the image data may include only one raw image, and the processor 120 may designate the only one raw image as the preliminary image.

In 530, the processor 140 (e.g., the target image generation module 430) may generate a target image by using an image processing model to process the preliminary image according to an optimization algorithm.

In some embodiments, the processor 140 may obtain an objective function for generating the target image. The objective function may include a likelihood term and a regularization term. The image processing model may be configured to perform multiple iterative operations for minimizing the result of the objective function. The target image may be an optimized result based on the preliminary image.

For instance, the objective function may be expressed as the following Equation (1)

$$\min_f D(f, g) + \lambda R(f), \qquad (1)$$

where f refers to the target image; g refers to components of different orders obtained by a band separation operation (also referred to as a "frequency spectrum separation operation"); D(f, g) refers to the likelihood term; R(f) refers to the regularization term; A is a parameter representing the weight of the regularization term. Merely by way of example, the objective function may be solved using the gradient descent algorithm according to the following equation (2):

$$f^{k+1} = f^k - \eta \nabla D(f^k, g) - \eta \lambda \nabla R(f^k), \qquad (2)$$

In some embodiments, the image processing model is a trained machine-learning model. The image processing model may be stored in the storage device 150 and may be obtained and used by the processor 140. Various portions of the image processing model may be configured to perform different processing operations. For instance, the image processing model may include a first sub-model and a second sub-model. The first sub-model may be configured to determine a first optimization term related to a likelihood term of an objective function. The second sub-model may be configured to determine a second optimization term related to a regularization term of the objective function. The second sub-model may also be a trained machine-learning model. More details regarding the training process for obtaining the image processing model may be found elsewhere in the present disclosure, for example, in FIG. 6.

In some embodiments, the optimization algorithm for generating the target image based on the preliminary image may include a Direct Fourier Transform (DFT) algorithm, a Filtered Back Projection (FBP) algorithm, an Algebraic Reconstruction Technique (ART), a Simultaneous Iterative Reconstruction Technique (SIRT), a Maximum Entropy (ME) method, or the like. The first optimization term and the second optimization term may be determined according to the optimization algorithm. For example, the optimization algorithm may be the gradient descent algorithm. The first optimization term may be a derivative of the likelihood term and the second optimization term may be a derivative of the regularization term.

To generate the target image using the image processing model, the processor 140 may perform a plurality of iterative operations based on the preliminary image. In a first iterative operation, the first sub-model may be configured to determine a first intermediate optimization term related to the likelihood term based on the preliminary image; the second sub-model may be configured to determine a second intermediate optimization term related to the regularization term based on the preliminary image. The image processing model may further include a third sub-model configured to generate an intermediate image based on the first intermediate optimization term, the second intermediate optimization term, and the preliminary image. The processor 140 may use the image processing model to perform a plurality of continuing iterative operations to update the intermediate image in a way that is similar to the first iterative operation until a termination criterion is met. When the processor 140 determines that the termination criterion is met, the intermediate image in the latest iterative operation may be determined as the target image. Alternatively, the processor 140 may further process the intermediate image in the latest iterative operation to obtain the target image. Such processing may include but not limited to adjusting the dimension of the intermediate image to make it suitable to be displayed on a screen, automatically adding one or more labels (such as a scale bar), etc.

In some embodiments, the termination criterion may relate to a value of the objective function. For example, the termination criterion may be satisfied if the result of the objective function is minimal or smaller than a threshold (e.g., a constant). As another example, the termination criterion may be satisfied if the value of the objective function converges. In some embodiments, convergence may be deemed to have occurred if the variation of the values of the objective function in two or more consecutive iterations is equal to or smaller than a threshold (e.g., a constant). In some embodiments, convergence may be deemed to have occurred if a difference between the value of the objective function (e.g., the value of the objective function) and a target value is equal to or smaller than a threshold (e.g., a constant). In some embodiments, the termination criterion may relate to an iterative number (count) of the objective function. For example, the termination criterion may be satisfied when a specified iterative number (or count) T of iterative operations have been performed. In some embodiments, the termination criterion may relate to an iterative time of the objective function (e.g., a time length that the first iterative operation is performed). For example, the termination condition may be satisfied if the iterative time of the objective function is greater than a threshold (e.g., a constant).

In some embodiments, at least one parameter related to the use of the image processing model may be set according to default settings or based on values designated by a user of the image processing system 100. For example, the parameter representing the weight of the regularization term A in the objective function shown in Equation (1) and/or the iterative number T may be chosen based on specific situations. The adjustment of these parameters may help improve the image quality of the target image. For example, the processor may firstly generate a target image based on default values of λ and T. After the target image is presented to the user, the user may evaluate the image quality of the target image. If the user determines that the image quality is not satisfying enough (e.g., there is still some noise in the target image), the user may manually adjust the value(s) of λ and/or T. The processor 140 may re-generate the target image according to the adjusted value(s) of λ and/or T. In some embodiments, there may be multiple value sets for λ and T stored in the storage device 150 of the image processing system 100, such as $(\lambda_1, T_1)$, $(\lambda_2, T_2)$, $(\lambda_3, T_3)$, etc. The processor 140 may generate multiple target images according to the multiple value sets for λ and T. These target images may be presented to the user and the user may select one of the target images with the highest image quality for further observation or analysis.

In some embodiments, the likelihood term may be determined according to an imaging principle of the image acquisition device 110 (or a physical model reflecting the imaging principle). For illustration purposes, the following description relates to the reconstruction of SIM images. It should be noted that the process 500 may be applied to the reconstruction of other types of images as well.

When the subject being imaged has a finite size, there may be a unique analytic function that coincides inside the bandwidth-limited frequency spectrum band of the optical transfer function (OTF) of the image acquisition device 110, thus enabling the reconstruction of the complete object by extrapolating the observed spectrum. Firstly, illumination parameters may be estimated based on image data generated or collected by the image acquisition device 110. SR frequency spectrum components of different orders may be obtained through the band separation operation. For example, in the frequency domain, the SR frequency spectrum components may be expressed using the following Equation (3):

$$G_{d,n}(k) = S(k - P_{d,n})O(k), \qquad (3)$$

where d and n refer to the direction of the illumination pattern and the order of the frequency spectrum, respectively; S(k) refers to the frequency spectrum of an actual fluorescence distribution of the subject; $P_{d,n}$ refers to a pattern wave vector of the illumination pattern; O(k) refers to the OTF of the image acquisition device 110.

Equation (2) may be converted to obtain the following Equation (4) in the space domain:

$$g_{d,n}(r) = [t(r) \times s(r)] * H(r), \qquad (4)$$

wherein s(r) refers to the spatial distribution of the actual fluorescence distribution; H(r) refers to a point spread function of the image acquisition device 110 obtained via a reverse Fourier transformation operation on the OTF; t(r) is a phase matrix for moving the frequency spectrum of s(r). In some embodiments, t(r) may be expressed using the following Equation (5)

$$t_{d,n}(r) = e^{j2\pi P_{-(d,n)}r}, \qquad (5)$$

where j is the imaginary unit.

According to Equation (3), the components of different orders g modulated by the OTF may be obtained from the target image if the pattern wave vectors, starting phase and modulation depth of the illumination pattern is known. Thus, the likelihood term may be expressed based on a two-norm form of the difference between $g_{d,n}$ obtained from the image data generated by the image acquisition device 110 and the components of different orders obtained from the intermediate image. In some embodiments, the likelihood term may be expressed using the following Equation (6):

$$D(f, g) = \sum_{d,n} \left\| (t_{d,n} \times f) * H - g_{d,n} \right\|_2^2, \qquad (6)$$

To make it more convenient for calculation, Equation (6) may be converted to the following Equation (7):

$$D(f, g) = \sum_{d,n} \left\| F^{-1}OFt_{d,n}f - g_{d,n} \right\|_2^2 t, \qquad (7)$$

where F and $F^{-1}$ refers to a Fourier transformation operation and a reverse Fourier transformation operation, respectively.

The derivative of D(f, g) may be expressed using the following equation (8):

$$\nabla D(f, g) = \sum_{d,n} t_{d,n}^H F^{-1}O^H F(F^{-1}OFt_{d,n}f - g_{d,n}), \qquad (8)$$

where the superscript H means conjugate transpose.

In some embodiments, the regularization term may be determined using a regularization term determination model, which may be a trained machine-learning model. For instance, the preliminary image may be inputted to the regularization term determination model, and the regularization term determination model may output an image representing the regularization term. Merely by way of example, the regularization term determination model may determine the regularization term based on total deep variation (TDV) regularization, Tikhonov regularization, total variation (TV) regularization, or sparsity regularization, or the like, which is not limited by the present disclosure. In some embodiments, the regularization term determination model may be a portion of the second sub-model. The determination of the second optimization term (e.g., a derivative) may be performed based on the regularization term by another portion of the second sub-model. For instance, FIG. 7B shows an exemplary structure of the second sub-model based on TDV regularization. The structure of the regularization term determination model may be represented by the upper portion of the model structure shown in FIG. 7B.

More details regarding the structure of the second sub-model may be found elsewhere, e.g., in the FIG. 7B and the descriptions thereof.

Merely by way of example, a TDV regularization term may be expressed using the following Equation (9):

$$R(f) = w^T N(Kf), \qquad (9)$$

where K refers to a convolution kernel with zero-average-value constrain; N refers to a convolution neural network; w is a weight vector.

It should be noted that the above description of the process 500 is merely provided for purposes of illustration, and not intended to limit the scope of the present disclosure. It should be understood that, after understanding the principle of the operations, persons having ordinary skills in the art may arbitrarily combine any operations, add or delete any operations, or apply the principle of the operations to other image processing processes, without departing from the principle. In some embodiments, process 500 may include one or more additional operations. For example, an additional operation may be added after operation 530 for displaying the target image. As another example, an additional operation may be added after operation 520 for pre-processing the preliminary image.

Figure 6:
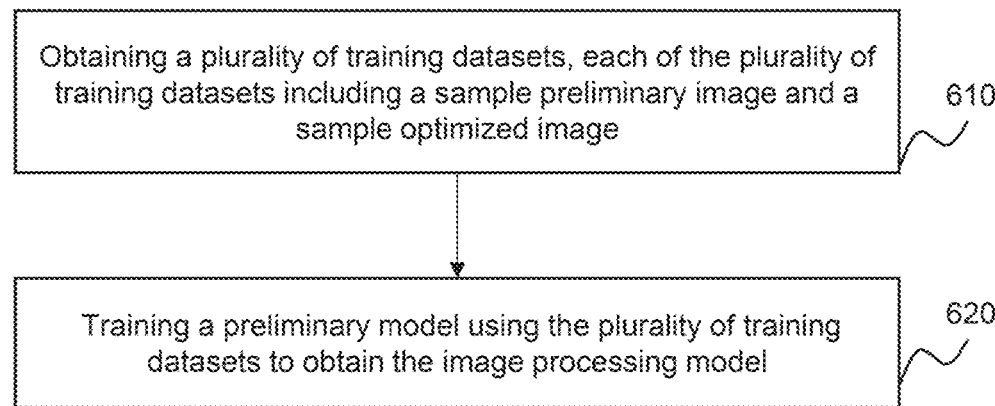
FIG. 6 is a flowchart illustrating an exemplary process for obtaining the image processing model via a training operation according to some embodiments of the present disclosure.

FIG. 6 is a flowchart illustrating an exemplary process for obtaining the image processing model via a training operation according to some embodiments of the present disclosure. In some embodiments, process 600 may be executed by the image processing system 100. For example, the process 600 may be implemented as a set of instructions (e.g., an application) stored in a storage device (e.g., the storage device 150, the storage 220, and/or the storage unit 370). In some embodiments, the processor 140 (e.g., the processor 210 of the computing device 200, the CPU 340 of the terminal 300, and/or one or more modules illustrated in FIG. 4) may execute the set of instructions and may accordingly be directed to perform the process 600. For example, process 600 may be performed by a training module of the processor 140 (not shown in FIG. 4). In some embodiments, process 600 may be performed by an external device. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6 and described below is not intended to be limiting.

In 610, the processor 140 may obtain a plurality of training datasets, each of the plurality of training datasets including a sample preliminary image and a sample optimized image.

In some embodiments, the signal-noise ratio of the sample optimized image may be higher than that of the corresponding sample preliminary image in the same training dataset. For example, the sample preliminary image may be an image generated based on image data generated by the image acquisition device 110, which may include noise and artifacts. The corresponding sample optimized image may be generated by reducing the noise and artifacts in the sample preliminary image using various techniques.

As another example, the sample optimized image may be a simulated SIM image without noise (or the noise is negligible). The corresponding sample preliminary image may be a simulated SIM image including noise. Specifically, a red green blue (RGB) image may be converted to a grayscale image. An edge detection operation may be performed on the grayscale image to obtain an edge image. The detected edges may be determined as simulated fluorescence distribution. A simulated structure light may be applied to the edge image followed by a convolution operation using the point spread function of the image acquisition device 110. Then a down-sampling operation may be performed on the resultant image to obtain the sample optimized image. The corresponding sample preliminary image may be generated by adding simulated uneven fluorescence background and noise to the sample optimized image.

In 620, the processor 140 may train a preliminary model using the plurality of training datasets to obtain the image processing model.

The preliminary model may be trained using various methods, such as the gradient descent algorithm, which is not limited by the present disclosure. During the training process, model parameters of the preliminary model are updated to obtain the image processing model. The model parameters are updated to minimize a difference between the sample optimized image and an optimized image output by the preliminary model based on the sample preliminary image.

As described earlier, the image processing model (or the preliminary model) may include a first sub-model and a second sub-model. The first sub-model may be configured to determine a first optimization term related to a likelihood term of an objective function. The second sub-model may be configured to determine a second optimization term related to a regularization term of the objective function. During the training process, model parameters related to the second sub-model may be updated while model parameters related to the first sub-model remain the same.

In some embodiments, multiple image processing models corresponding to different types of training datasets may be stored in the storage device 150. For instance, the different types of training datasets may include training datasets corresponding to different types of subjects, training datasets corresponding to different imaging parameters (e.g., illumination parameters, exposure parameters), training datasets corresponding to different levels of signal-noise ratio, training datasets corresponding to different types of image acquisition devices, etc. Merely by way of example, a specific image processing model may be trained using a plurality of training sets corresponding to a specific type of subject, such as an actin ring, a nuclear pore complex structure, mitochondrial cristae, or the like. The processing device 140 may obtain the image processing model corresponding to the type of the imaged subject. For example, the processing device 140 may identify the type of the imaged subject using an image recognition technique based on the raw images collected by the image acquisition device 140. As another example, the processing device 140 may identify the type of the imaged subject according to subject information inputted by a user.

It should be noted that the above description of the process 600 is merely provided for purposes of illustration, and not intended to limit the scope of the present disclosure. It should be understood that, after understanding the principle of the operations, persons having ordinary skills in the art may arbitrarily combine any operations, add or delete any operations, or apply the principle of the operations to other image processing processes, without departing from the principle. In some embodiments, process 500 may include one or more additional operations. For example, an additional operation may be added after operation 620 for testing the performance of the image processing model. If the performance of the image processing model does not meet the requirements of the user, a further training operation may be performed on the image processing model, and/or a new group of training sets may be used for the training process.

Figure 7A:
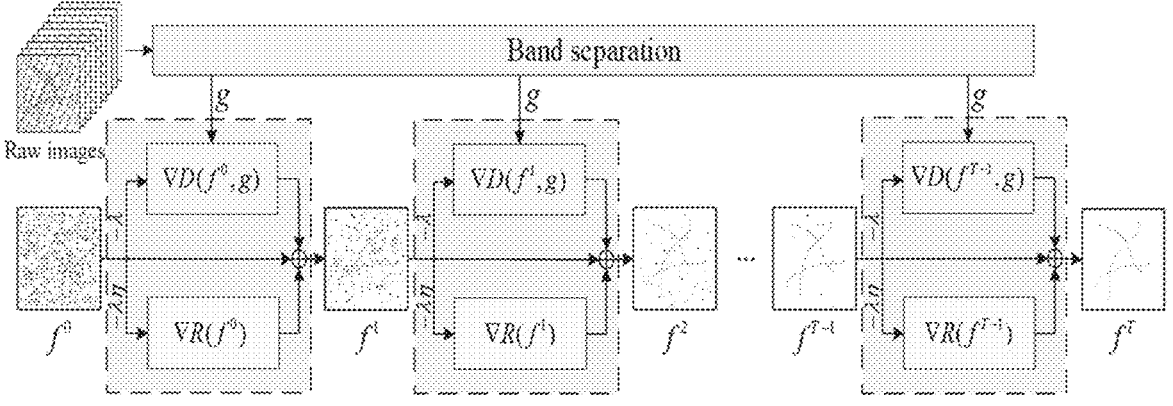
FIG. 7A is a schematic diagram illustrating the generation of the target image according to some embodiments of the present disclosure.
Figure 7B:
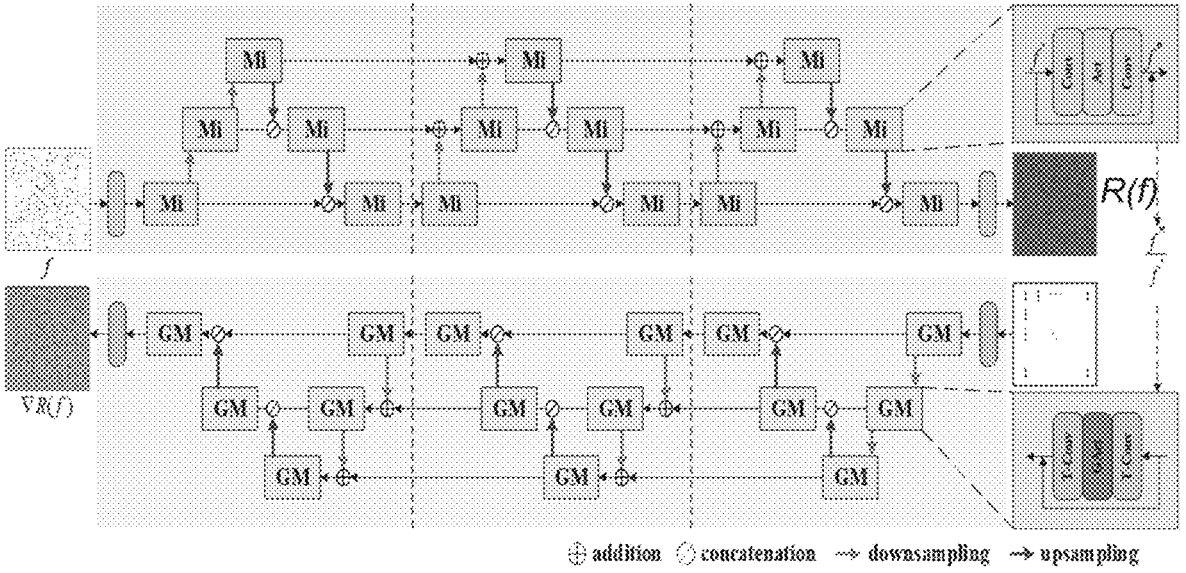
FIG. 7B is a schematic diagram illustrating an exemplary structure of the second sub-model according to some embodiments of the present disclosure.

FIG. 7A is a schematic diagram illustrating the generation of the target image according to some embodiments of the present disclosure. For illustration purposes, the target image is a SIM image.

As shown in FIG. 7A, a band separation operation may be performed on the raw images to determine SR frequency spectrum components of different orders. The raw images may include multiple images corresponding to different directions and different phases of illumination pattern. A preliminary image $f^0$ may be generated based on the raw images. A first iterative operation may be formed on $f^0$ to obtain an intermediate image $f^1$. A plurality of continuing iterative operations may be performed to update $f^1$ so as to obtain the final target image $f^T$. Here T refers to the iterative number. In each iteration, the image processing model determines a derivative of the likelihood term and a derivative of the regularization term. The intermediate images $f^1$, $f^2$ . . . , and $f^{T-1}$ are updated based on the derivative of the likelihood term and the derivative of the regularization term.

FIG. 7B is a schematic diagram illustrating an exemplary structure of the second sub-model according to some embodiments of the present disclosure. For illustration purposes, the second sub-model is shown in FIG. 7B is a deep learning network based on TDV regularization.

The second sub-model may include two portions. A first portion (e.g., the upper portion shown in FIG. 7B) of the second sub-model is configured to determine a regularization term of the objective function. A second portion (e.g., the lower portion shown in FIG. 7B) of the second sub-model is configured to determine an optimization term corresponding to the regularization term (e.g., a derivative of the regularization term).

The first portion of the second sub-model includes three U-Net-like structures each consisting of five micro-blocks including residual structures. After the input image f is inputted into the first portion of the second sub-model, a regularization term R(f) is obtained by the first portion. To determine the derivative of R(f), an image matrix of which each element equals 1 is inputted to the second portion of the second sub-model. A reverse calculation is conducted according to the structure of the first portion of the second sub-model. During the reverse calculation of the second portion of the second sub-model, the convolutional layers of the second portion are modified to be the transposed convolution layers; the activation function layer of the second portion is modified to be a derivative of the activation function of the first portion.

The present disclosure is further described according to the following examples, which should not be construed as limiting the scope of the present disclosure.

EXAMPLES

Example 1—Selection of Parameters λ and T

Figure 8A:
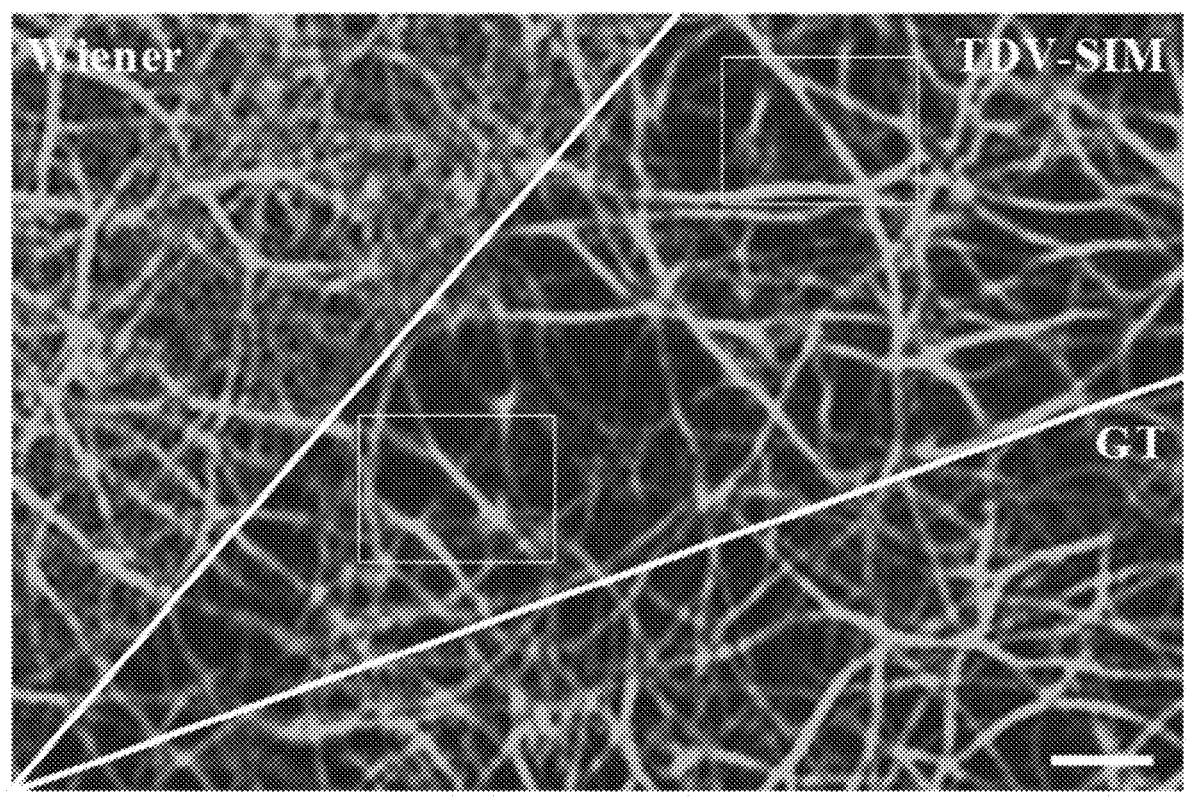
FIG. 8A shows a reference image obtained using the conventional Wiener reconstruction method, a target image obtained using the image processing model provided by the present disclosure, and an image representing the corresponding true value (GT) according to some embodiments of the present disclosure.
Figure 8B:
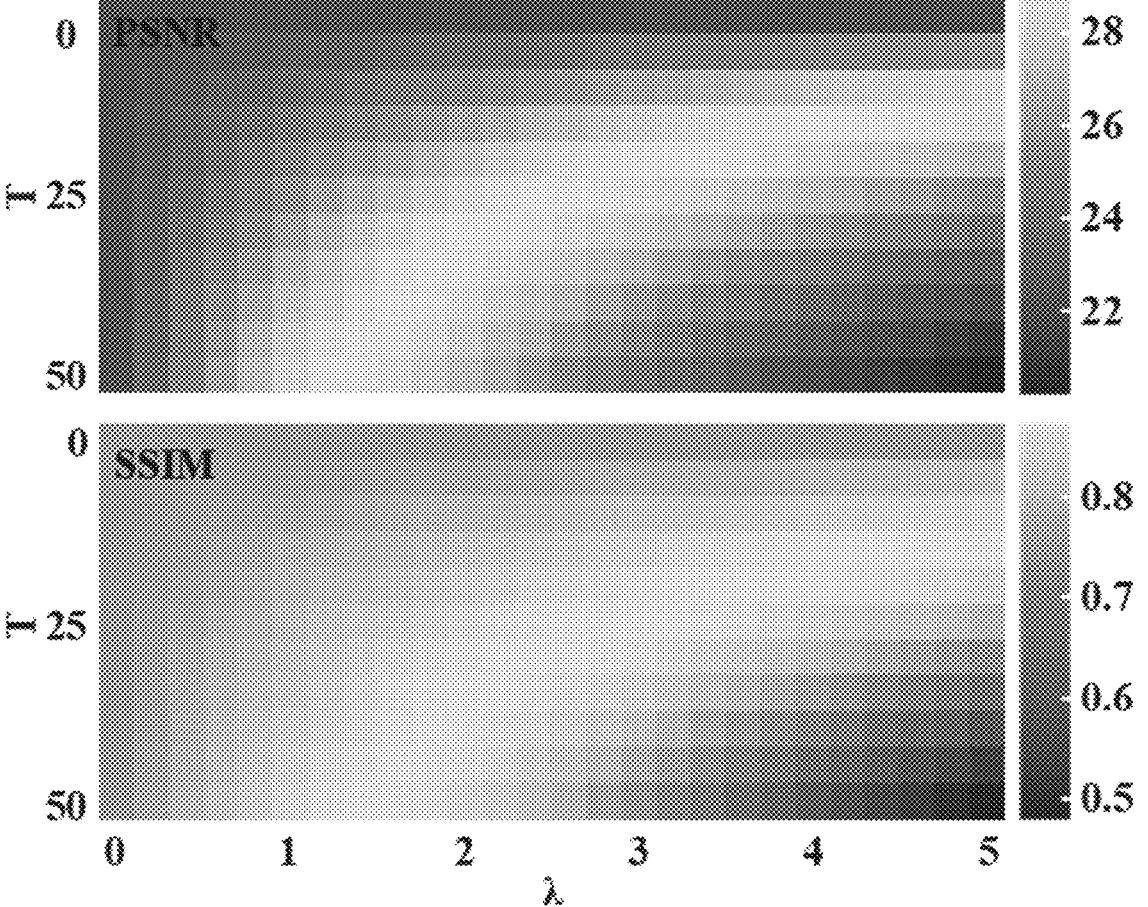
FIG. 8B shows the Peak Signal-to-Noise Ratio (PSNR) and Structural Similarity (SSIM) of the target image and GT when changing $\lambda$ and T according to some embodiments of the present disclosure.
Figure 8C:
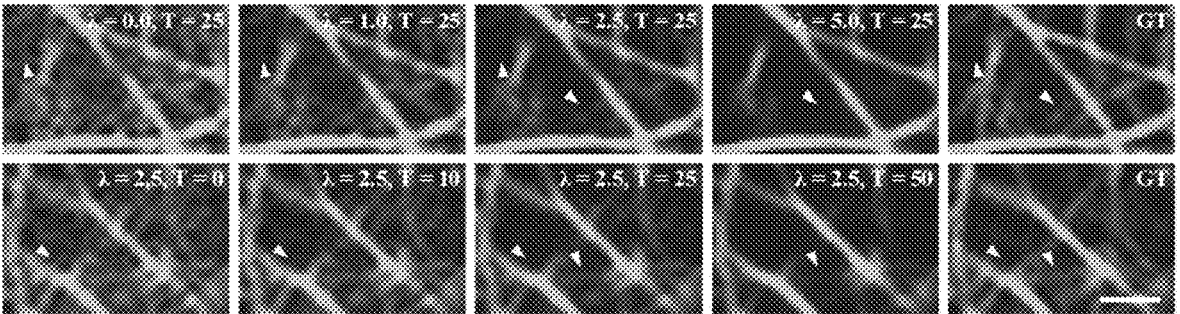
FIG. 8C shows images of portions marked by the gray boxes in FIG. 8A according to some embodiments of the present disclosure.

FIG. 8A-8C shows the effect of some parameters on the target image according to some embodiments of the present disclosure. As described earlier, the values of λ and T may affect the image quality of the target image. FIG. 8A shows a reference image using the conventional Wiener reconstruction method, a target image using the image processing model provided by the present disclosure, and the ground truth (GT) image. For illustration purposes, the image processing model provided by the present disclosure may be applied to the reconstruction of an SIM image, and the second sub-model of the image processing model may be based on TDV regulation. Accordingly, the image processing model may be referred to as "TDV-SIM". FIG. 8B shows the Peak Signal-to-Noise Ratio (PSNR) and Structural Similarity (SSIM) of the target image and GT when changing λ and T. FIG. 8C shows images of portions marked by the gray boxes in FIG. 8A, which respectively corresponds to a target image reconstructed using the image processing model provided by the present disclosure based on the same image data using different values of λ and T. Compared to the GT image of actin filaments (averages of multiple Wiener-processed images, FIG. 8A), the peak signal-to-noise (PSNR, FIG. 8B) and structural similarity index measure (SSIM, FIG. 1d, top right) values of TDV-SIM reconstructions with different weight parameter λ and iteration number T were quantified. As shown in FIG. 8C, artifacts may not be suppressed entirely if λ (or T) is too small; in contrast, if λ (or T) is too large with a fixed T of 25 (or a λ of 2.5), genuine signals may be removed incorrectly. Thus, the optimal parameters in this example was set to be 2.5 and 25 for λ and T, respectively. These results indicate that the selection of the values of λ and T may affect the image quality of the obtained target image.

In some embodiments, the processor may firstly generate a target image based on default values of λ and T. After the target image is presented to the user, the user may evaluate the image quality of the target image. If the user determines that the image quality is not satisfying enough (e.g., there is still some noise in the target image), the user may manually adjust the value(s) of λ and/or T. Alternatively, the processor 140 may generate multiple target images according to the multiple value sets for λ and T. These target images may be presented to the user and the user may select one of the target images with the highest image quality for further observation or analysis.

Figure 9A:
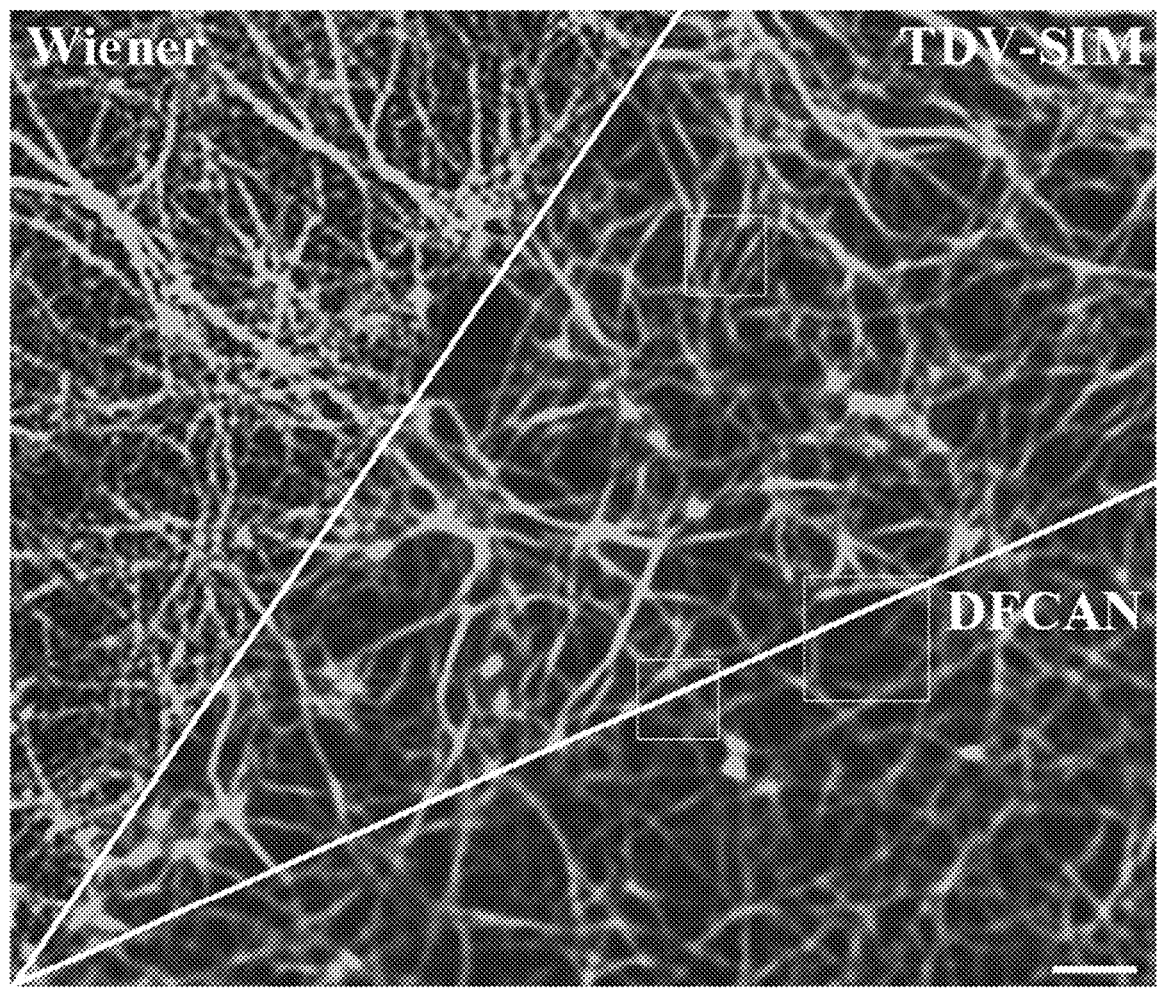
FIG. 9A shows actin filaments under the super-resolution structured illumination microscopy (SR-SIM) according to some embodiments of the present disclosure.
Figure 9B:
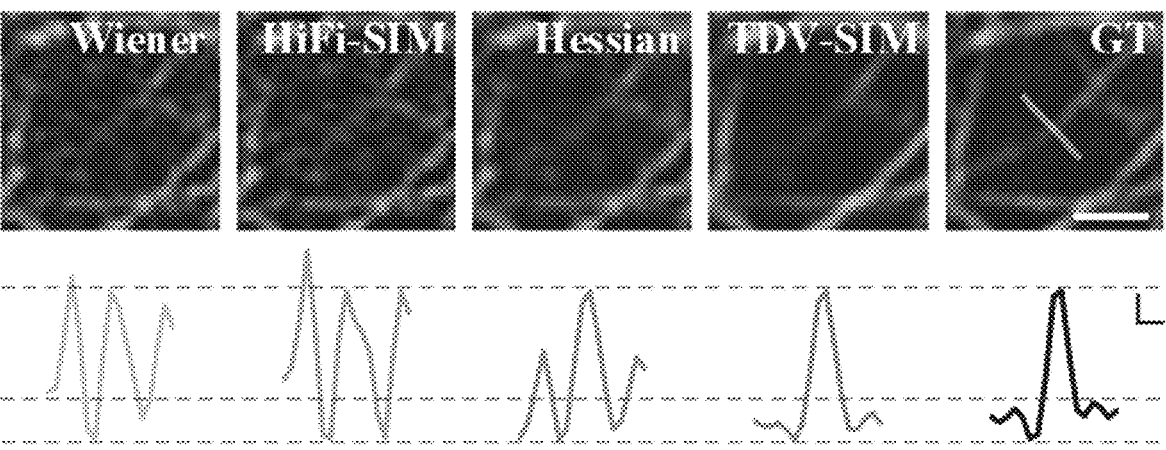
FIG. 9B shows magnified views of the larger box regions marked by gray boxes in FIG. 9A reconstructed by Wiener deconvolution, HiFi-SIM, Hessian-SIM, and TDV-SIM, as well as the GT image according to some embodiments of the present disclosure.
Figure 9C:
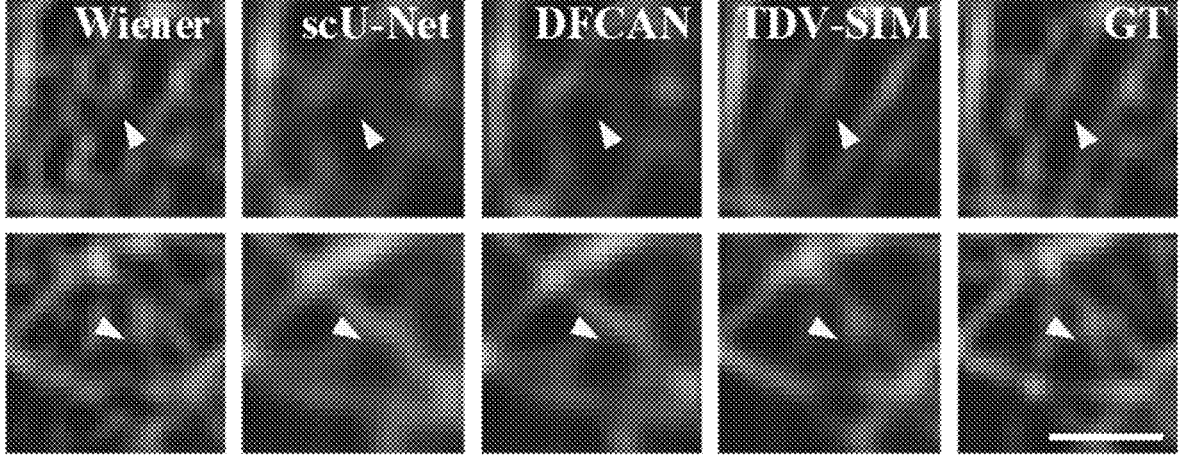
FIG. 9C shows magnified views of the smaller box regions marked by gray boxes in FIG. 9A reconstructed by Wiener deconvolution, scU-Net, DFCAN, and TDV-SIM, as well as the GT image according to some embodiments of the present disclosure.
Figure 9D:
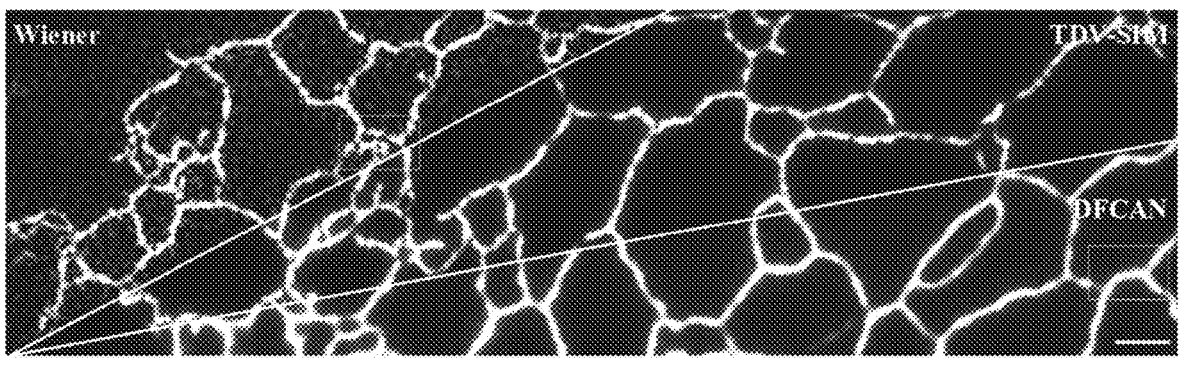
FIG. 9D shows endoplasmic reticulum (ER) under the SR-SIM.
Figure 9E:
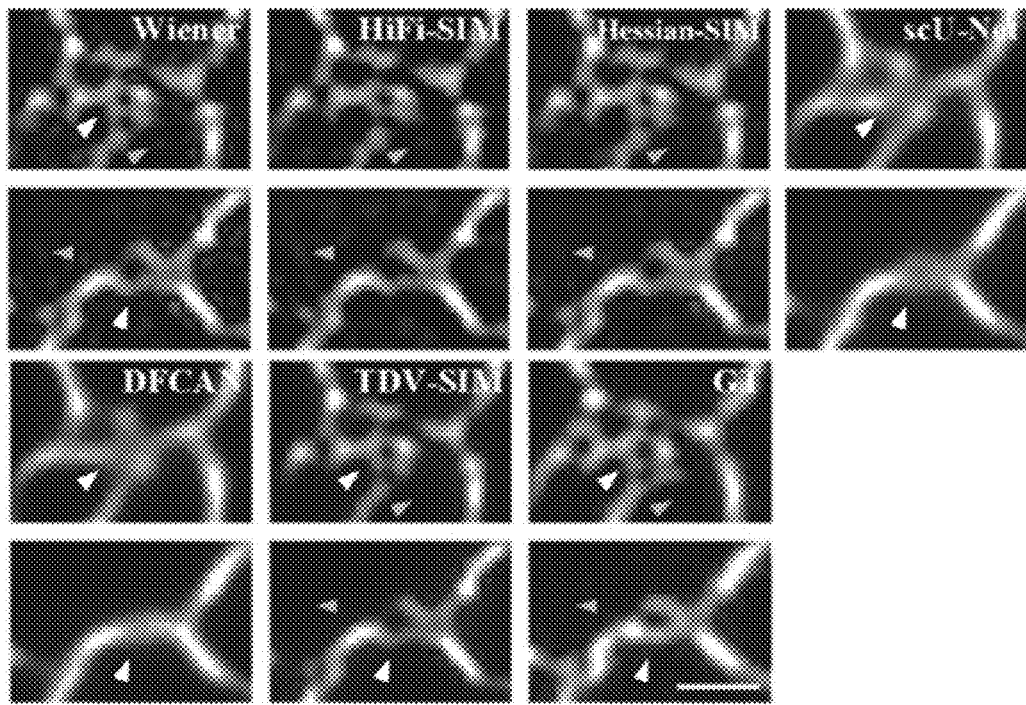
FIG. 9E shows magnified views of the boxed regions in FIG. 9D reconstructed by Wiener deconvolution, HiFi-SIM, Hessian-SIM, scU-Net, DFCAN, and TDV-SIM, as well as the GT image.
Figure 9F:
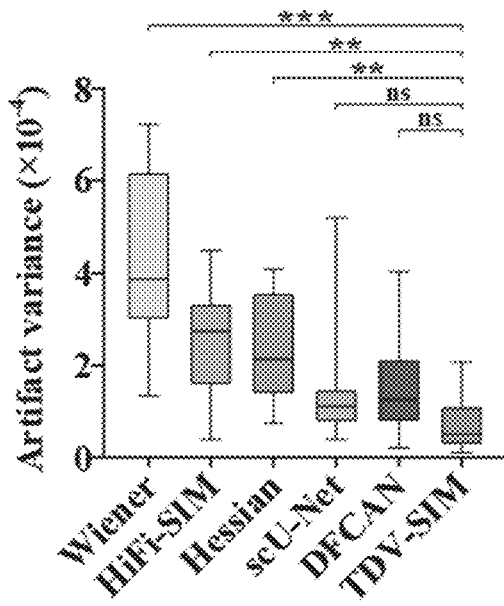
FIG. 9F shows artifact variances of actin filaments from background regions in different reconstructions.
Figure 9G:
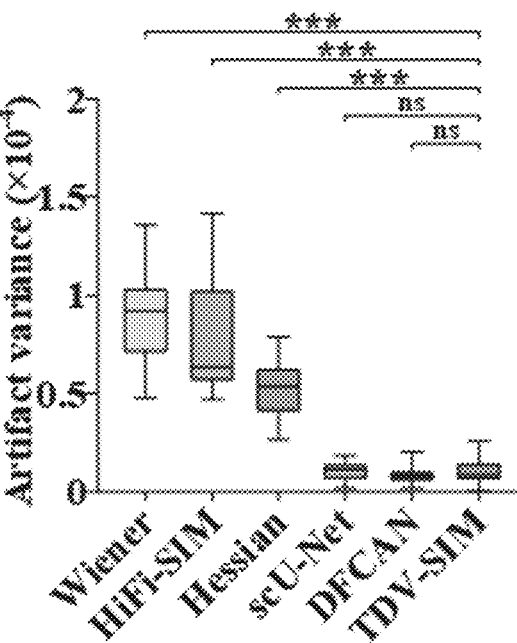
FIG. 9G shows artifact variances of ER tubules from background regions in different reconstructions.
Figure 9H:
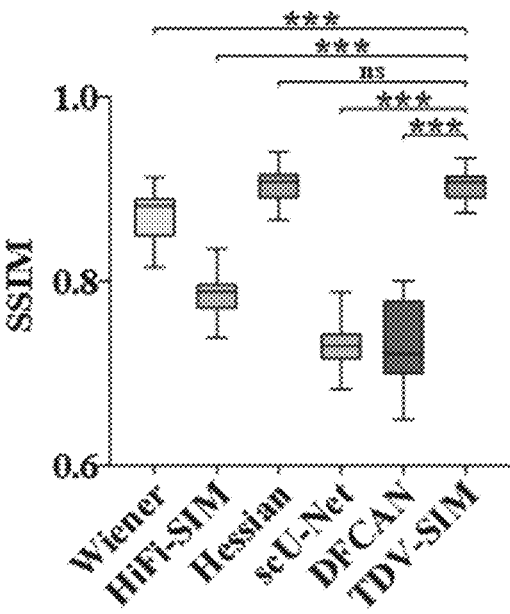
FIG. 9H shows SSIM of actin filaments in different reconstructions.
Figure 9I:
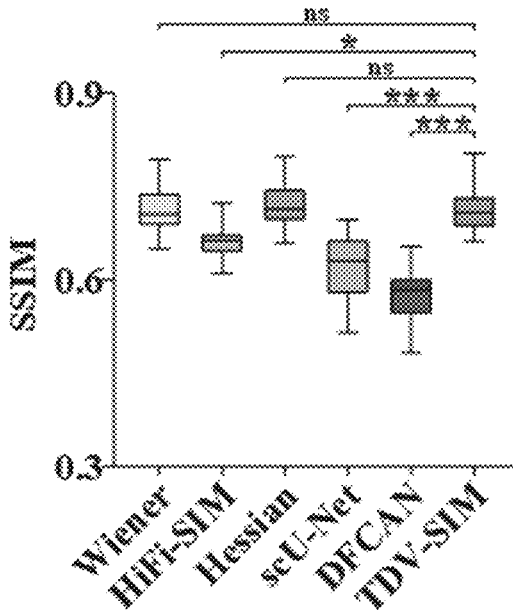
FIG. 9I shows SSIM of ER tubules in different reconstructions.
Figure 9J:
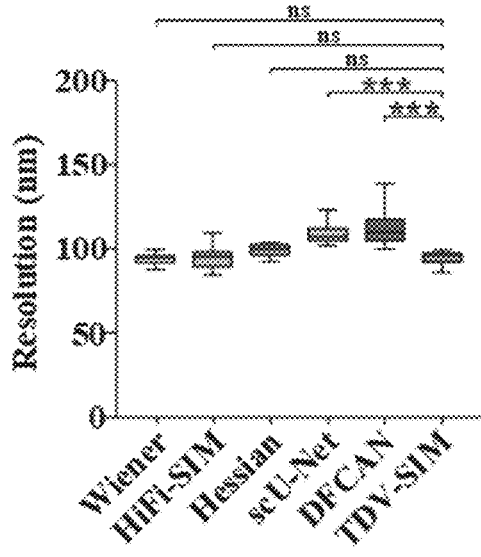
FIG. 9J shows resolutions of different reconstructions of actin filaments in FIGS. 9A-9C.
Figure 10A:
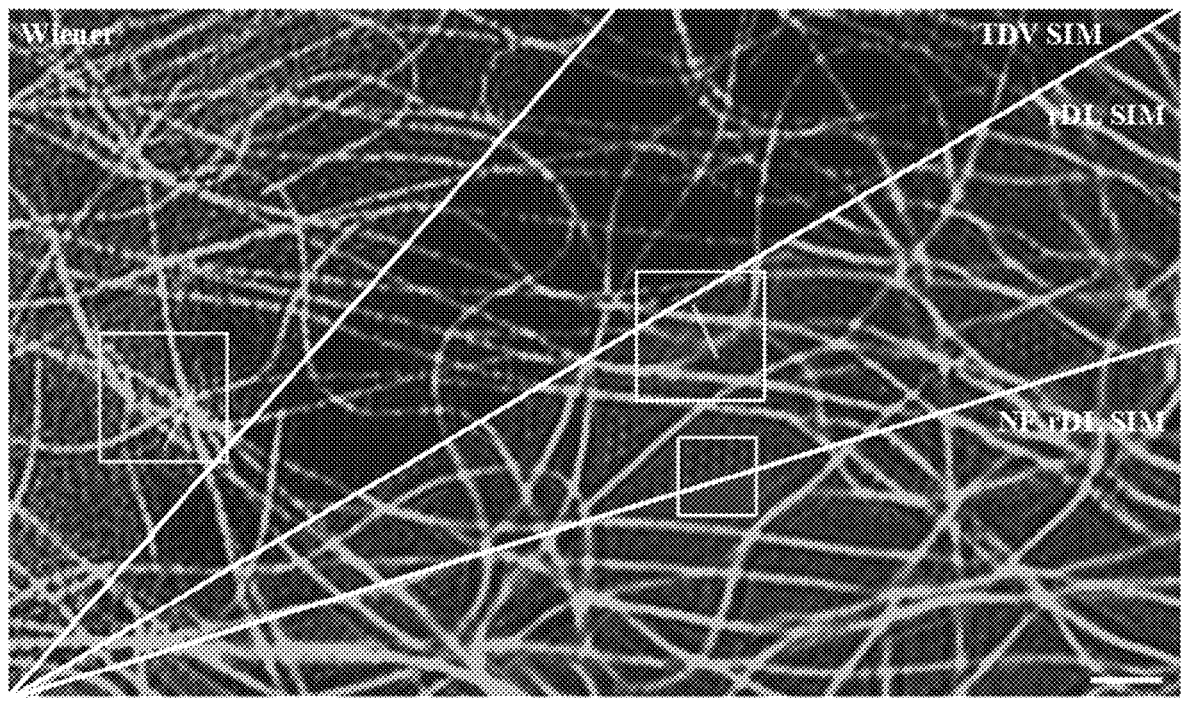
FIG. 10A shows microtubules from the BioSR dataset under the SR-SIM reconstructed with different methods.
Figure 10B:
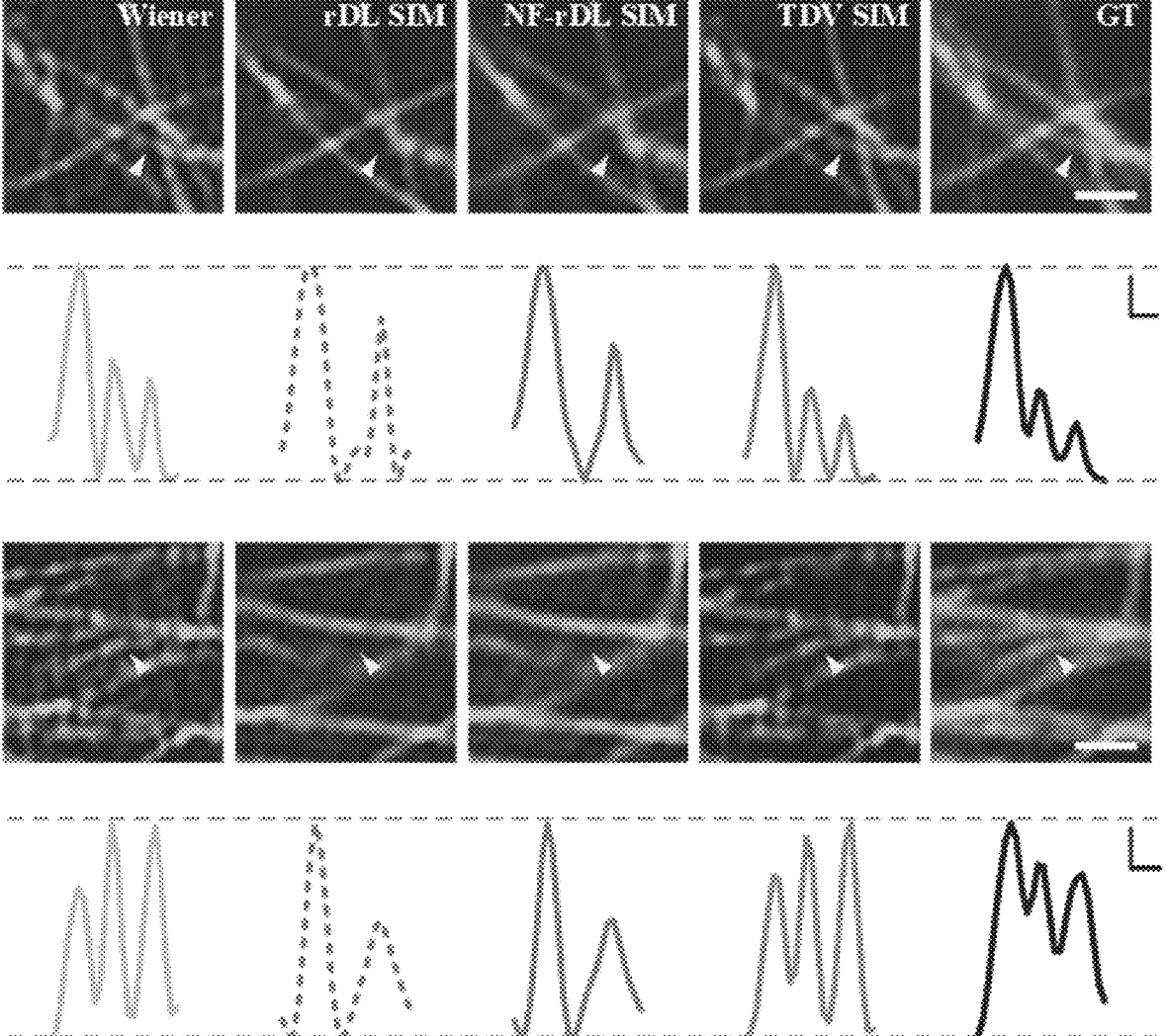
FIG. 10B shows magnified views of the larger boxed regions in FIG. 10A reconstructed by Wiener deconvolution, rDL SIM, NF-rDL SIM, and TDV-SIM.
Figure 10C:
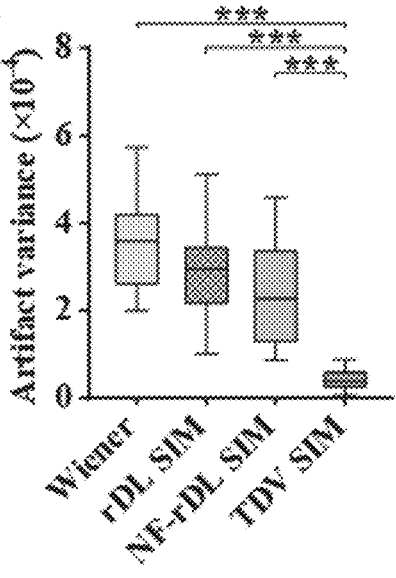
FIG. 10C shows artifact variances of the background regions in different reconstructions.
Figure 10D:
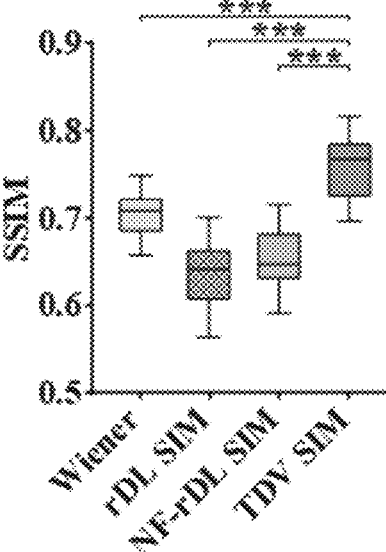
FIG. 10D shows SSIM of microtubules in different reconstructions.

Example 2—TDV-SIM May Improve the Image Quality of an Image Reconstructed Based on Image Data with a Relatively Low Signal-Noise Ratio For illustration purposes, TDV-SIM was compared with other reconstruction methods, including physical-model-based (Wiener deconvolution11, HiFi-SIM, Hessian-SIM) and pure deep learning-based methods (scU-Net24, DFCAN25) using synthetic images with known GT. The results are shown in FIGS. 9A-9E. FIG. 9F shows artifact variances of actin filaments from background regions in different reconstructions. FIG. 9G shows artifact variances of ER tubules from background regions in different reconstructions. FIG. 9H shows SSIM of actin filaments in different reconstructions. FIG. 9I shows SSIM of ER tubules in different reconstructions. FIG. 9J shows resolutions of different reconstructions of actin filaments in FIGS. 9A-9C.

TDV-SIM confers balanced performance in generating SR images of high SSIM, low normalized root-mean-square error, and low artifacts among all reconstruction methods. Next, dynamic actin filaments and ER in live cells were observed with short exposures (actin: 1 ms, FIG. 9A; ER: 0.789 ms, FIG. 9D). Despite the improved reconstructions compared to the Wiener deconvolution, HiFi-SIM and Hessian-SIM still produced artifacts due to noise amplification in background regions with low SNR. TDV-SIM produced more continuous actin filaments with fewer artifacts but comparable SSIM values and resolutions to the conventional reconstruction methods (FIG. 9B, E, F-J). In contrast, pure DL-based methods led to reconstruction with fewer artifacts at the price of reduced resolution and decreased SSIM values. In addition, inaccurate inferences were often observed at the intersections of actin filaments and ER (the white (bright) arrows in FIG. 9C and FIG. 9E). The gray (darker) arrows in FIG. 9E highlights the artifacts of physical-model-based methods.

Furthermore, TDV SIM was compared with rDL SIM29 on a microtubule image from the BioSR dataset (FIGS. 10A-10D). By incorporating prior knowledge of illumination patterns into the DL network, rDL SIM aimed to denoise raw images rationally. Still, it produced punctuated artifacts in background regions, which may be suppressed with a notch filter (NF) (white boxed region in FIG. 10A, FIG. 10C). Moreover, microtubules within densely-labeled regions were often absent from notch-filtered rDL SIM reconstructions (NF-rDL SIM, arrows in FIG. 10B), which was confirmed by the missing spikes in corresponding fluorescence profiles in the bottom. In comparison, TDV-SIM can avoid the missing signal problem of notch-filtered rDL SIM and produce higher fidelity reconstructions with fewer artifacts and higher SSIM (FIGS. 10A-10D).

These results indicate that the TDV-SIM method provided by the present disclosure may improve the image quality of an image including regular cell structures that is reconstructed based on image data with a relatively low signal-noise ratio.

Figure 11A:
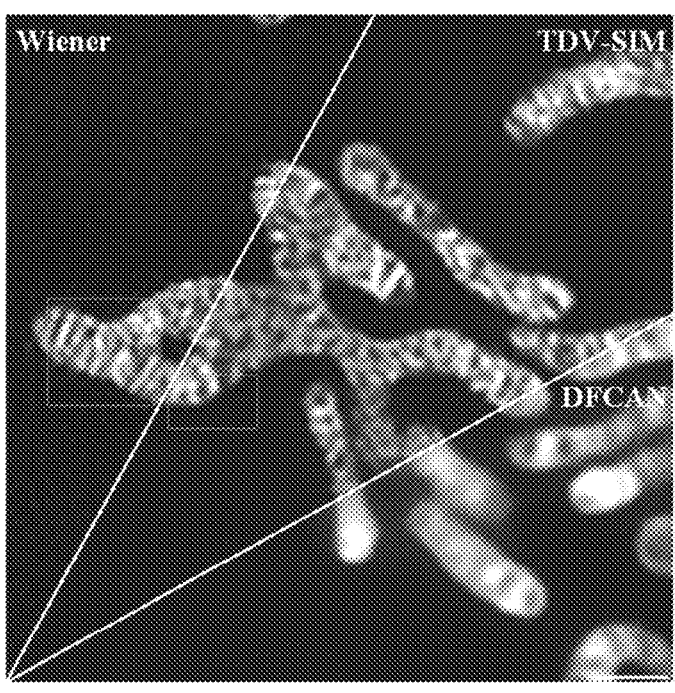
FIG. 11A shows mitochondria under the SR-SIM.
Figure 11B:
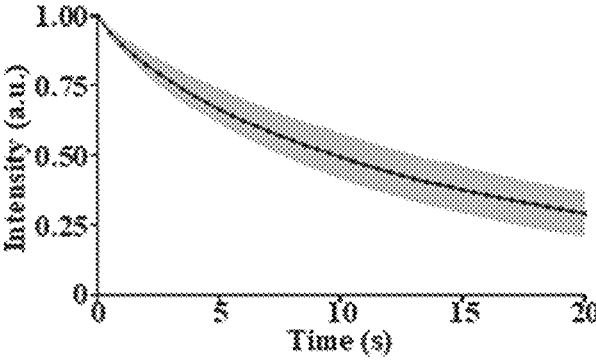
FIG. 11B shows time-dependent bleaching in fluorescence intensities of mitochondria.
Figure 11C:
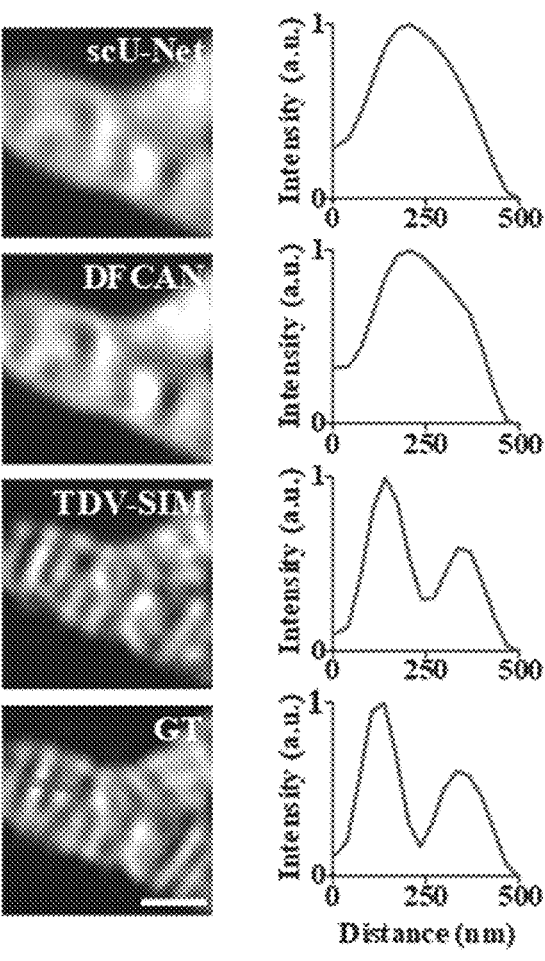
FIG. 11C shows magnified views of the larger boxed region in FIG. 11A reconstructed by scU-Net, DFCAN, and TDV-SIM and the corresponding GT image at 0 s.
Figure 11D:
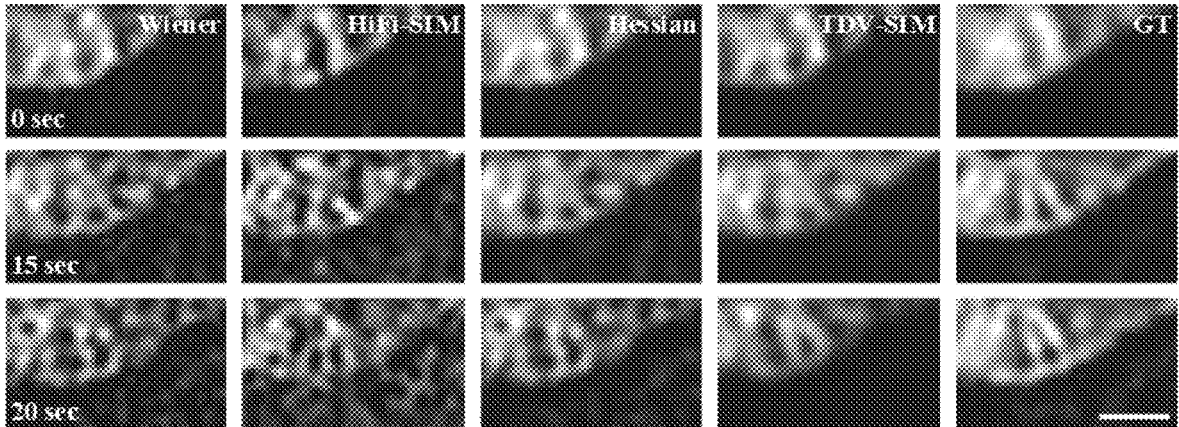
FIG. 11D shows magnified views of the smaller boxed region in FIG. 11 Are constructed by Wiener deconvolution, HiFi-SIM, Hessian-SIM, and TDV-SIM and the corresponding GT image at 0 s, 15 s, and 20 s.
Figure 11E:
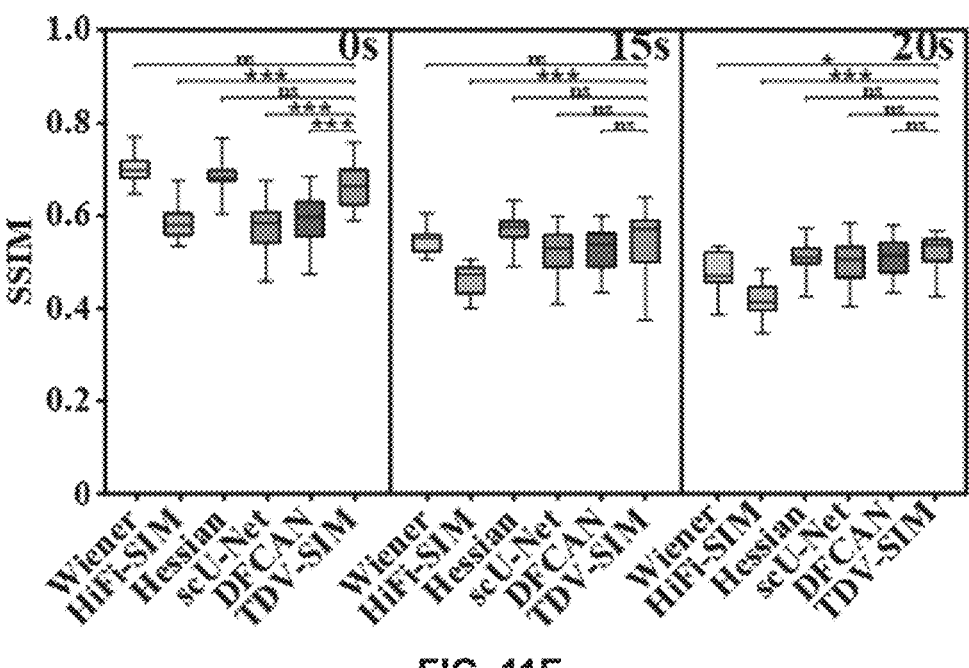
FIG. 11E shows the SSIMs of regions enclosed mitochondria from different reconstructions compared to GT images at 0 s, 15 s, and 20 s.
Figure 11F:
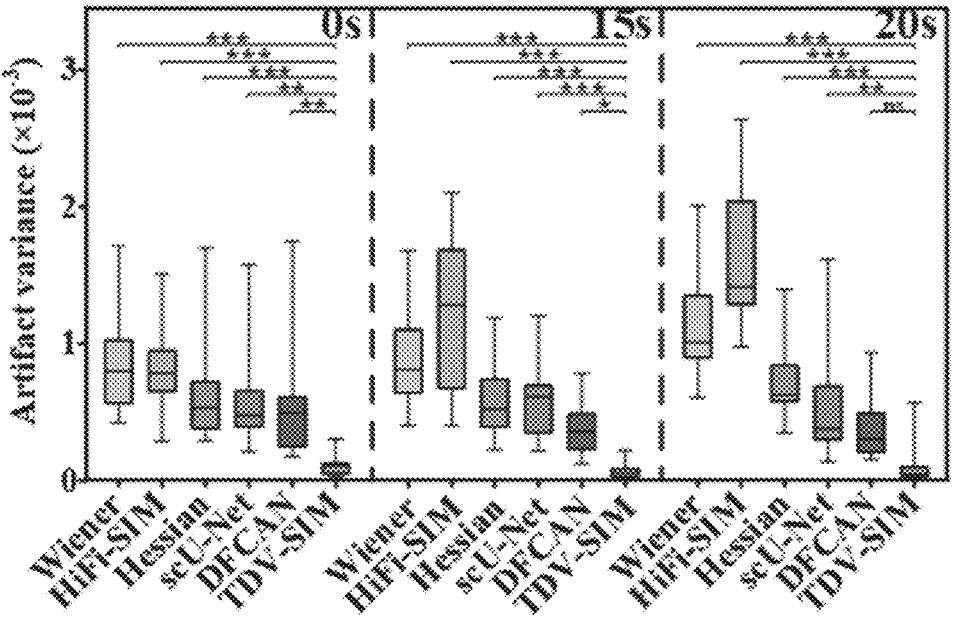
FIG. 11F shows the artifact variances of the background regions in different reconstructions at 0 s, 15 s, and 20 s.

Example 3—TDV-SIM May Improve the Accuracy of Reconstruction of Intricate and Dynamic Mitochondrial Cristae Structures in Live Cells after Prolonged Bleaching Photobleaching constitutes a major problem of fluorescence SR imaging, continuously reducing image SNR and compromising the quality of reconstructed images, espe-
cially upon resolving nonstereotypical structures such as
mitochondrial cristae30. Therefore, the performance of
TDV-SIM in resolving mitochondrial cristae dynamics for a
prolonged time in live cells was benchmarked (FIG. 11A).
During the 20 s recording, the fluorescence intensity of
Mito-Tracker decreased by ~30% due to photobleaching
(FIG. 11B). In the beginning, model-based methods could
reconstruct high-quality intricate mitochondrial cristae,
which were gradually corrupted with artifacts gradually due
to photobleaching (FIGS. 11D and F). In contrast, although
pure DL-based methods consistently generated fewer arti-
facts during the imaging period, they could not predict most
cristae structures in the first place (FIGS. 11C, 11E, and
11F). Outperforming all other methods, TDV-SIM obtained
sharp mitochondrial cristae structures with fewer artifacts
and high SSIM with the GT, which persisted even under
photobleaching conditions (FIGS. 11C-11F)

Figure 12A:
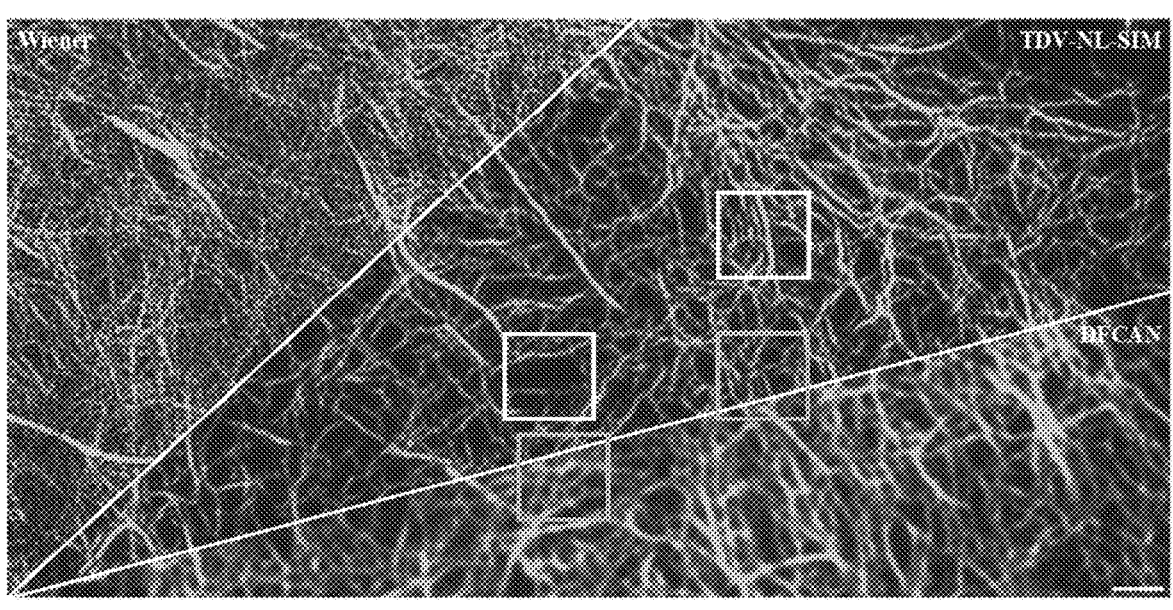
FIG. 12A shows the actin filaments under the NL SIM.
Figure 12B:
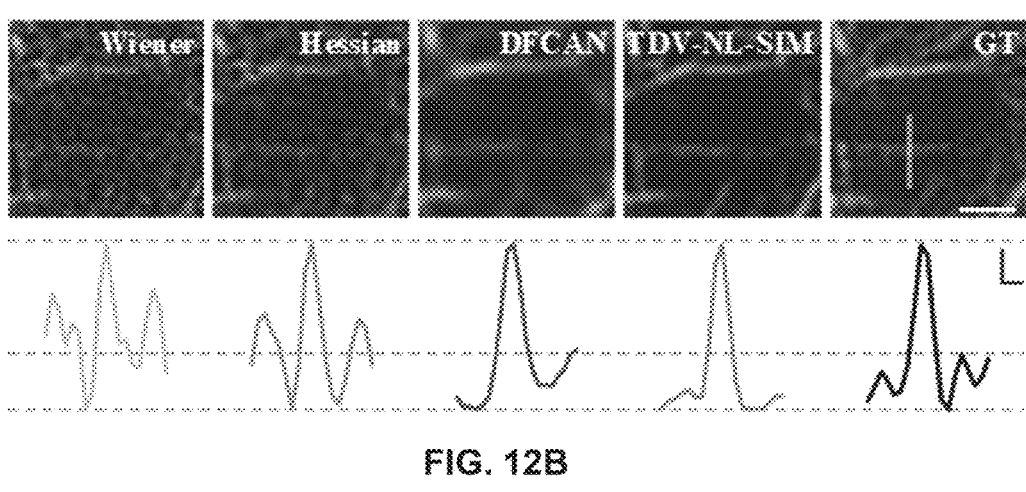
FIGS. 12B-12C show magnified views of the white boxed regions in FIG. 12A reconstructed by Wiener deconvolution, Hessian-SIM, DFCAN and TDV-NL-SIM.
Figure 12C:
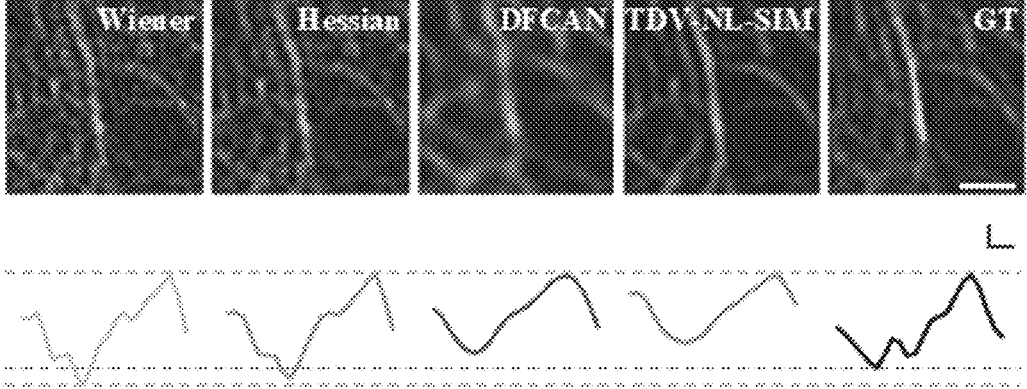
Figure 12D:
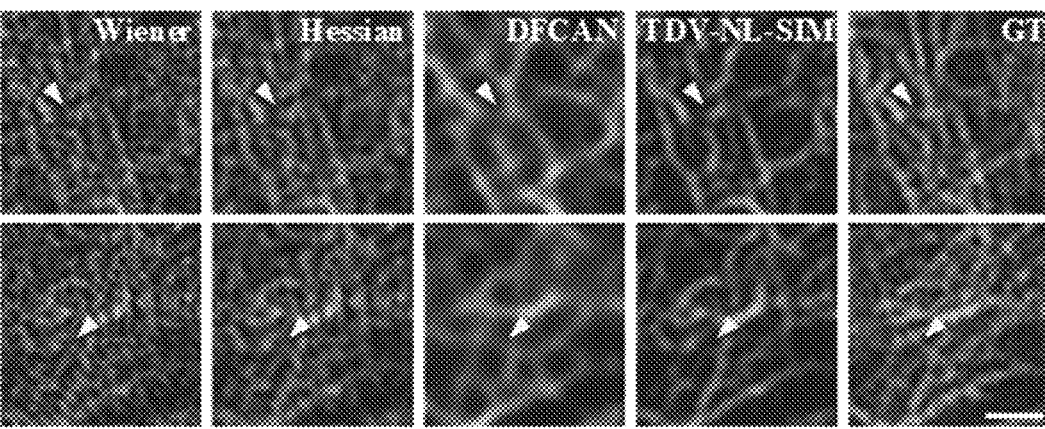
FIG. 12D shows magnified views of the gray boxed regions in (a) reconstructed by Wiener deconvolution, Hessian-SIM, DFCAN and TDV-NL-SIM.
Figure 12E:
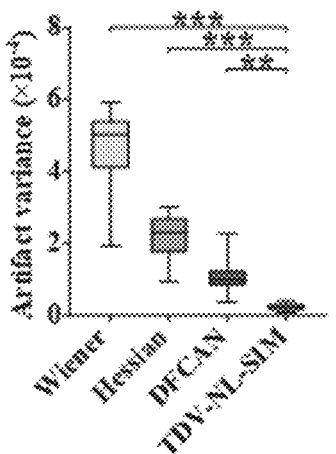
FIG. 12E shows artifact variances of actin filaments from background regions in different reconstructions.
Figure 12F:
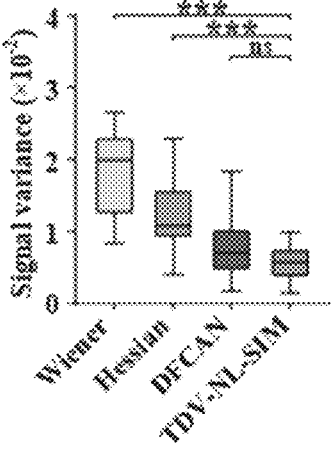
FIG. 12F shows signal variance along the actin filaments in different reconstructions.
Figure 12G:
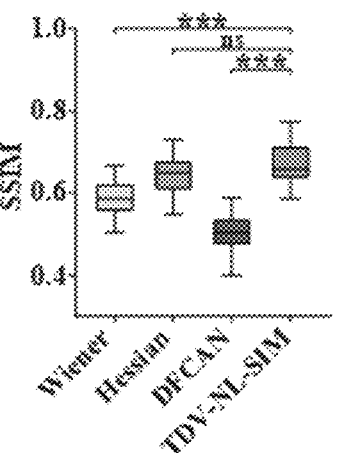
FIG. 12G shows SSIM of actin filaments in different reconstructions.

Example 4—TDV-SIM Enables Better Reconstruction of Actin Filaments Under Nonlinear SIM In comparison to conventional linear SIM, nonlinear (NL)
SIM achieves higher lateral resolution up to ~60 nm. While
NL-SIM suffers from the reconstruction artifacts especially
with low SNR raw data. By combining the NL-SIM physical
model with the TDV regularization term, we proposed the
TDV-NL-SIM. We benchmarked the performance of TDV-
NL-SIM with Wiener deconvolution, Hessian-NL-SIM, and
DFCAN on actin filaments within the BioSR dateset (FIG.
12A). Similar to the linear SIM circumstances, Hessian-NL-
SIM provided improved reconstructions than Wiener decon-
volution but still produced significant artifacts in back-
ground regions. In contrast, TDV-NL-SIM produced more
continuous actin filaments (FIGS. 12C and 12F) with fewer
artifacts but comparable SSIM values to Hessian-NL-SIM
(FIGS. 12B, 12E, and 12G). DFCAN led to reconstruction
with comparable continuity but decreased SSIM values to
TDV-NL-SIM (FIGS. 12F and 12G). The inaccurate infer-
ences of DFCAN at the actin filaments intersections can be
avoided by the TDV-NL-SIM (arrows in FIG. 11D).

These results indicate that the image processing model
provided by the present disclosure may effectively reduce
artifacts or noise of the reconstructed image generated based
on raw images with relatively low signal-noise ratio due to,
e.g., photobleaching.

The image processing model provided by the present
disclosure combines the constrain of the imaging principle
as well as the use of the deep learning network, thereby
effectively improving the image quality of the reconstructed
image generated based on image data collected by the image
acquisition device. The use of the deep learning network
contributes to reducing artifacts or noise in the target image.
Moreover, the use of the likelihood term ensures that the
reconstruction is based on the imaging principle, thus reduc-
ing or avoiding errors in the reconstructed image.

Having thus described the basic concepts, it may be rather
apparent to those skilled in the art after reading this detailed
disclosure that the foregoing detailed disclosure is intended
to be presented by way of example only and is not limiting.
Various alterations, improvements, and modifications may
occur and are intended for those skilled in the art, though not
expressly stated herein. These alterations, improvements,
and modifications are intended to be suggested by this
disclosure and are within the spirit and scope of the exem-
plary embodiments of this disclosure.

Moreover, certain terminology has been used to describe
embodiments of the present disclosure. For example, the
terms "one embodiment," "an embodiment," and/or "some
embodiments" mean that a particular feature, structure, or
characteristic described in connection with the embodiment
is included in at least one embodiment of the present
disclosure. Therefore, it is emphasized and should be appre-
ciated that two or more references to "an embodiment" or
"one embodiment" or "an alternative embodiment" in vari-
ous portions of this specification are not necessarily all
referring to the same embodiment. Furthermore, the particu-
lar features, structures, or characteristics may be combined
as suitable in one or more embodiments of the present
disclosure.

Further, it will be appreciated by one skilled in the art,
aspects of the present disclosure may be illustrated and
described herein in any of a number of patentable classes or
contexts including any new and useful process, machine,
manufacture, or composition of matter, or any new and
useful improvement thereof. Accordingly, aspects of the
present disclosure may be implemented entirely hardware,
entirely software (including firmware, resident software,
micro-code, etc.), or combining software and hardware
implementation that may all generally be referred to herein
as a "unit," "module," or "system." Furthermore, aspects of
the present disclosure may take the form of a computer
program product embodied in one or more computer read-
able media having computer readable program code embod-
ied thereon.

A computer readable signal medium may include a propa-
gated data signal with computer readable program code
embodied therein, for example, in baseband or as part of a
carrier wave. Such a propagated signal may take any of a
variety of forms, including electro-magnetic, optical, or the
like, or any suitable combination thereof. A computer read-
able signal medium may be any computer readable medium
that is not a computer readable storage medium and that may
communicate, propagate, or transport a program for use by
or in connection with an instruction execution system,
apparatus, or device. Program code embodied on a computer
readable signal medium may be transmitted using any
appropriate medium, including wireless, wireline, optical
fiber cable, RF, or the like, or any suitable combination of
the foregoing.

Computer program code for carrying out operations for
aspects of the present disclosure may be written in any
combination of one or more programming languages,
including an object oriented programming language such as
Java, Scala, Smalltalk, Eiffel, JADE, Emerald, C++, C#, VB.
NET, Python or the like, conventional procedural program-
ming languages, such as the "C" programming language,
Visual Basic, Fortran 2103, Perl, COBOL 2102, PHP, ABAP,
dynamic programming languages such as Python, Ruby and
Groovy, or other programming languages. The program
code may execute entirely on the user's computer, partly on
the user's computer, as a stand-alone software package,
partly on the user's computer and partly on a remote
computer or entirely on the remote computer or server. In the
latter scenario, the remote computer may be connected to the
user's computer through any type of network, including a
local area network (LAN) or a wide area network (WAN), or
the connection may be made to an external computer (for
example, through the Internet using an Internet Service
Provider) or in a cloud computing environment or offered as
a service such as a Software as a Service (Saas).

Furthermore, the recited order of processing elements or
sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or terminal.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about." "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image processing, implemented on a machine having at least one processor and at least one storage device, the method comprising:
obtaining image data generated by an image acquisition device;
generating a preliminary image by processing the image data;
generating a target image by using an image processing model to process the preliminary image according to an optimization algorithm, the image processing model including a first sub-model and a second sub-model, wherein
the first sub-model is configured to determine a first optimization term related to a likelihood term of an objective function, and
the second sub-model is configured to determine a second optimization term related to a regularization term of the objective function, wherein the second sub-model is a trained machine-learning model, and input data of the first sub-model and the second sub-model are same.

2. The method of claim 1, wherein the optimization algorithm is an iterative algorithm, and the generating a target image by using an image processing model to process the preliminary image according to an optimization algorithm comprises:
in a first iterative operation,
generating, based on the preliminary image, a first intermediate optimization term related to the likelihood term using the first sub-model;
generating, based on the preliminary image, a second intermediate optimization term related to the regularization term using the second sub-model; and
generating an intermediate image based on the first intermediate optimization result, the second intermediate optimization result, and the preliminary image.

3. The method of claim 2, wherein the generating a target image by using an image processing model to process the preliminary image according to an optimization algorithm further comprises:
generating the target image by performing a plurality of continuing iterative operations based on the intermediate image until a termination criterion is met.

4. The method of claim 3, wherein the first iterative operation and the plurality of continuing iterative operations are configured to minimize a result of the objective function, and the objective function is related to components of different orders obtained by a band separation operation.

5. The method of claim 3, wherein the termination criterion is related to at least one of a value of the objective function, an iterative number of the objective function, and an iterative time of the objective function.

6. The method of claim 5, wherein the termination criterion includes values of the objective function in two or more consecutive iterations is equal to or smaller than a threshold.

7. The method of claim 3, further comprising:
generating multiple target images according to multiple value sets for the regularization term and an iterative number.

8. The method of claim 1, wherein the first optimization term is a derivative of the likelihood term, and the second optimization term is a derivative of the regularization term.

9. The method of claim 1, wherein the trained machine-learning model is a deep learning neural network based on total deep variation (TDV) regularization, Tikhonov regularization, total variation (TV) regularization, or sparsity regularization.

10. The method of claim 1, wherein the likelihood term is determined based on an imaging principle of the image acquisition device, and the image acquisition device includes a structured illumination microscopy (SIM).

11. The method of claim 1, wherein the image processing model is obtained by a training operation including:

obtaining a plurality of training datasets, each of the plurality of training datasets including a sample preliminary image and a sample optimized image; and training a preliminary model using the plurality of training datasets to obtain the image processing model.

12. The method of claim 11, wherein each of at least a portion of the training datasets includes a sample preliminary image and a sample optimized image, which has a higher signal-noise ratio than the sample preliminary image.

13. The method of claim 11, wherein during the training operation, model parameters relating to the second sub-model are updated and model parameters related to the first sub-model remain same.

14. The method of claim 1, further comprising:

generating an image stack by performing Wiener filtering on a plurality of raw images in a set of raw images.

15. The method of claim 1, wherein the image processing model further includes a third sub-model configured to generate an intermediate image based on a first intermediate optimization term, a second intermediate optimization term, and the preliminary image.

16. The method of claim 1, further comprising:

generating a target image of the imaged object based on an image processing model corresponding to the type of the imaged object.

17. A system for image processing, comprising:

at least one storage device including a set of instructions; and at least one processor in communication with the at least one storage device, wherein when executing the set of instructions, the at least one processor is directed to cause the system to perform operations including:

obtaining image data generated by an image acquisition device;

generating a preliminary image by processing the image data;

generating a target image by using an image processing model to process the preliminary image according to an optimization algorithm, the image processing model including a first sub-model and a second sub-model, wherein the first sub-model is configured to determine a first optimization term related to a likelihood term of an objective function, and the second sub-model is configured to determine a second optimization term related to a regularization term of the objective function, wherein the second sub-model is a trained machine-learning model, and input data of the first sub-model and the second sub-model are same.

18. The system of claim 17, wherein the first optimization term is a derivative of the likelihood term, and the second optimization term is a derivative of the regularization term.

19. The system of claim 17, wherein the likelihood term is determined based on an imaging principle of the image acquisition device.

20. A non-transitory computer readable medium, comprising at least one set of instructions for image processing, wherein when executed by one or more processors of a computing device, the at least one set of instructions causes the computing device to perform a method, the method comprising:

obtaining image data generated by an image acquisition device;

generating a preliminary image by processing the image data;

generating a target image by using an image processing model to process the preliminary image according to an optimization algorithm, the image processing model including a first sub-model and a second sub-model, wherein the first sub-model is configured to determine a first optimization term related to a likelihood term of an objective function, and the second sub-model is configured to determine a second optimization term related to a regularization term of the objective function, wherein the second sub-model is a trained machine-learning model, and input data of the first sub-model and the second sub-model are same.

* * * * *